(12) United States Patent
Ghanouni et al.

(10) Patent No.: US 12,514,282 B2
(45) Date of Patent: Jan. 6, 2026

(54) AEROSOL GENERATION

(71) Applicant: NICOVENTURES TRADING LIMITED, London (GB)

(72) Inventors: Kav Ghanouni, London (GB); Jocelyn Benning, London (GB); Walid Abi Aoun, London (GB)

(73) Assignee: NICOVENTURES TRADING LIMITED, London (GB)

( * ) Notice: Subject to any disclaimer, the term of this patent is extended or adjusted under 35 U.S.C. 154(b) by 714 days.

(21) Appl. No.: 17/263,925

(22) PCT Filed: Jul. 31, 2019

(86) PCT No.: PCT/EP2019/070732
§ 371 (c)(1),
(2) Date: Jan. 28, 2021

(87) PCT Pub. No.: WO2020/025734
PCT Pub. Date: Feb. 6, 2020

(65) Prior Publication Data
US 2021/0315265 A1    Oct. 14, 2021

(30) Foreign Application Priority Data

Jul. 31, 2018  (GB) ...................................... 1812497
Jul. 31, 2018  (GB) ...................................... 1812509

(51) Int. Cl.
*A24D 1/20*    (2020.01)
*A24B 3/14*    (2006.01)
(Continued)

(52) U.S. Cl.
CPC .................. *A24D 1/20* (2020.01); *A24B 3/14* (2013.01); *A24B 15/14* (2013.01); *A24B 15/167* (2016.11);
(Continued)

(58) Field of Classification Search
CPC ......... A24B 15/167; A24B 3/14; A24B 15/14; A24B 15/186; A24C 5/01; A24D 1/20
See application file for complete search history.

(56) References Cited

U.S. PATENT DOCUMENTS

| 4,693,728 A | 9/1987 | Clare et al. |
| 5,339,838 A | 8/1994 | Young et al. |

(Continued)

FOREIGN PATENT DOCUMENTS

| CN | 101631478 A | 1/2010 |
| CN | 108285441   | 7/2018 |

(Continued)

OTHER PUBLICATIONS

"International Preliminary Report on Patentability received for PCT Patent Application No. PCT/EP2019/070724, mailed on Feb. 11, 2021", 14 pages.

(Continued)

*Primary Examiner* — Michael H. Wilson
*Assistant Examiner* — Jennifer A Kessie
(74) *Attorney, Agent, or Firm* — WOMBLE BOND DICKINSON (US) LLP

(57) ABSTRACT

A method of making an aerosol generating material comprising an amorphous solid comprises (a) providing a slurry comprising: 1-60 wt % of a gelling agent; and 5-80 wt % of an aerosol generating agent; and optionally, 0.1-60 wt % of at least one active substance and/or flavorant; wherein these weights are calculated on a dry weight basis; (b) shaping the slurry; (c) setting the slurry to form a gel; and (d) drying the gel to form an amorphous solid. The setting agent comprises $Ca^{2+}$ and one or more counterions is added to the slurry before and/or during shaping the slurry and/or setting the slurry to form the gel, the setting agent having an average molar mass of less than about 400 gmol$^{-1}$.

13 Claims, 5 Drawing Sheets

(51) Int. Cl.
*A24B 15/14* (2006.01)
*A24B 15/167* (2020.01)
*A24C 5/01* (2020.01)
*A24F 40/20* (2020.01)
*A24F 40/46* (2020.01)

(52) U.S. Cl.
CPC ............... *A24C 5/01* (2020.01); *A24F 40/20* (2020.01); *A24F 40/46* (2020.01)

(56) References Cited

U.S. PATENT DOCUMENTS

| | | | |
|---|---|---|---|
| 2009/0301505 A1* | 12/2009 | Liu | A24B 13/00 131/309 |
| 2011/0104218 A1* | 5/2011 | Karles | B01J 13/22 424/463 |
| 2012/0152264 A1* | 6/2012 | Coleman | A24B 15/14 252/182.29 |
| 2016/0120224 A1 | 5/2016 | Mishra et al. | |
| 2016/0120225 A1 | 5/2016 | Mishra et al. | |
| 2016/0295922 A1 | 10/2016 | John et al. | |
| 2017/0340005 A1 | 11/2017 | Terao | |
| 2018/0070641 A1 | 3/2018 | Batista et al. | |
| 2018/0279666 A1* | 10/2018 | Aoun | A24F 40/46 |

FOREIGN PATENT DOCUMENTS

| | | |
|---|---|---|
| EP | 0419974 | 4/1991 |
| JP | H07300795 A | 11/1995 |
| JP | 2000041648 A | 2/2000 |
| JP | 2015504668 A | 2/2015 |
| KR | 20160131035 A | 11/2016 |
| RU | 2645324 C2 | 2/2018 |
| WO | 2011045609 A1 | 4/2011 |
| WO | 2013178769 A1 | 12/2013 |
| WO | 2015062983 A2 | 5/2015 |
| WO | WO2015071682 | 5/2015 |
| WO | 2016005533 A1 | 1/2016 |
| WO | 2016135331 A1 | 9/2016 |
| WO | WO2016184977 | 11/2016 |
| WO | WO2016184978 | 11/2016 |
| WO | 2016207192 A1 | 12/2016 |
| WO | 2017077110 A1 | 5/2017 |
| WO | WO2017097840 | 6/2017 |
| WO | 2018100366 A2 | 6/2018 |
| WO | WO2019073225 | 4/2019 |

OTHER PUBLICATIONS

"International Preliminary Report on Patentability received for PCT Patent Application No. PCT/EP2019/070732, mailed on Feb. 11, 2021", 12 pages.

"International Search Report and Written Opinion received for PCT Patent Application No. PCT/EP2019/070724, mailed on Nov. 7, 2019", 18 pages.

International Search Report and Written Opinion for PCT/EP2019/070732 date mailed Nov. 6, 2019.

* cited by examiner

Figure 6

AEROSOL GENERATION

PRIORITY CLAIM

The present application is a National Phase entry of PCT Application No. PCT/EP2019/070732, filed Jul. 31, 2019 which claims priority from GB Patent Application No. 1812509.6 filed Jul. 31, 2018 and GB Patent Application No. 1812497.4 filed Jul. 31, 2018 each of which is hereby fully incorporated herein by reference.

TECHNICAL FIELD

The present disclosure relates to aerosol generation.

BACKGROUND

Smoking articles such as cigarettes, cigars and the like burn tobacco during use to create tobacco smoke. Alternatives to these types of articles release an inhalable aerosol or vapor by releasing compounds from a substrate material by heating without burning. These may be referred to as non-combustible smoking articles or aerosol generating assemblies.

One example of such a product is a heating device which release compounds by heating, but not burning, a solid aerosolizable material. This solid aerosolizable material may, in some cases, contain a tobacco material. The heating volatilizes at least one component of the material, typically forming an inhalable aerosol. These products may be referred to as heat-not-burn devices, tobacco heating devices or tobacco heating products. Various different arrangements for volatilizing at least one component of the solid aerosolizable material are known.

As another example, there are e-cigarette/tobacco heating product hybrid devices, also known as electronic tobacco hybrid devices. These hybrid devices contain a liquid source (which may or may not contain nicotine) which is vaporized by heating to produce an inhalable vapor or aerosol. The device additionally contains a solid aerosolizable material (which may or may not contain a tobacco material) and components of this material are entrained in the inhalable vapor or aerosol to produce the inhaled medium.

SUMMARY

A first aspect of the present disclosure provides a method of making an aerosol generating material comprising an amorphous solid, the method comprising:

(a) providing a slurry comprising:
 1-60 wt % of a gelling agent; and
 5-80 wt % of an aerosol generating agent;
 and optionally, 0.1-60 wt % of at least one active substance and/or flavorant;
wherein these weights are calculated on a dry weight basis;
 (b) shaping the slurry;
 (c) setting the slurry to form a gel; and
 (d) drying the gel to form an amorphous solid;
wherein a setting agent comprising $Ca^{2+}$ and one or more counterions is added to the slurry before and/or during (b) and/or (c), the setting agent having an average molar mass of less than about 400 $gmol^{-1}$.

In some embodiments, the active substance comprises or consists of tobacco extract and/or nicotine.

In some embodiments, the $Ca^{2+}$ is present in the setting agent in an amount of at least 15% of the molar mass of $Ca^{2+}$ ions and counterions of the setting agent taken together. Put another way, the setting agent comprises at least 15 wt % $Ca^{2+}$ on a molar mass basis.

In some embodiments, each counterion present in the setting agent has a molar mass of less than about 250 $gmol^{-1}$.

In some embodiments, each counterion present in the setting agent has a molar mass of from about 40 to 150 $gmol^{-1}$.

In some embodiments, the setting agent is added to the slurry with an aqueous solvent.

In some embodiments, the setting agent is added to the slurry as an aqueous setting agent solution.

In some embodiments, the setting agent is sprayed onto the slurry. For example, where the setting agent is added to the slurry as an aqueous setting agent solution, the aqueous setting agent solution may be sprayed onto the slurry.

In some embodiments, the one or more counterions comprise acetate, formate, carbonate, hydrogencarbonate, chloride, lactate, or a combination thereof.

In some embodiments, the setting agent has an aqueous solubility of greater than or equal to 0.1 g/L at 20° C.

In some embodiments, the gelling agent comprises alginate, and the alginate is present in the slurry in an amount of 10-30 wt % on a dry weight basis.

In some embodiments, shaping the slurry comprises forming the slurry as a sheet.

In some embodiments, one or more counterions is a carbon-containing anion.

According to another aspect there is provided a method of making an aerosol generating material comprising an amorphous solid, the method comprising:

(a) providing a slurry comprising:
 1-60 wt % of a gelling agent; and
 5-80 wt % of an aerosol generating agent; and
 optionally, 0.1-60 wt % of at least one active substance and/or flavorant;
wherein these weights are calculated on a dry weight basis;
 (b) shaping the slurry
 (c) setting the slurry to form a gel, and
 (d) drying the gel to form an amorphous solid;
wherein a setting agent comprising $Ca^{2+}$ and one or more counterions is added to the slurry before and/or during (b) and/or (c);
wherein the $Ca^{2+}$ is present in the setting agent in an amount of at least 15% of the molar mass of $Ca^{2+}$ ions and counterions taken together.

According to a further aspect there is provided a method of making an aerosol generating material comprising an amorphous solid, the method comprising:

(a) providing a slurry comprising:
 1-60 wt % of a gelling agent; and
 5-80 wt % of an aerosol generating agent;
 and optionally, 0.1-60 wt % of at least one active substance and/or flavorant;
wherein these weights are calculated on a dry weight basis;
 (b) shaping the slurry
 (c) setting the slurry to form a gel, and
 (d) drying the gel to form an amorphous solid;
wherein a setting agent comprising $Ca^{2+}$ and one or more counterions is added to the slurry before and/or during (b) and/or (c);
wherein each counterion present in the setting agent has a molar mass of less than about 250 $gmol^{-1}$.

According to another aspect there is provided an aerosol generating material obtainable from a method as described herein.

In some embodiments, the amorphous solid comprises from about 1 wt % to about 15 wt % water, calculated on a wet weight basis.

According to another aspect there is provided an aerosol generating substrate comprising an aerosol generating material as described herein.

In some embodiments, the substrate further comprises a carrier on which the amorphous solid is provided.

According to another aspect there is provided an aerosol generating article for use in an aerosol generating assembly, the aerosol generating article comprising an aerosol generating substrate as described herein.

In some embodiments, the amorphous solid is provided in the aerosol generating article in sheet form. In some embodiments, the amorphous solid is provided in the aerosol generating article as a shredded sheet.

According to another aspect there is provided an aerosol generating assembly comprising an aerosol generating substrate as described herein and a heater configured to heat but not burn the aerosol generating substrate.

To the extent that they are compatible, features disclosed herein in relation to one aspect of the disclosure are explicitly disclosed in combination with each and every other aspect.

Further features and advantages of the disclosure will become apparent from the following description of preferred embodiments of the disclosure, given by way of example only, which is made with reference to the accompanying drawings.

BRIEF DESCRIPTION OF THE DRAWINGS

FIG. 6 shows a section view of an example of an aerosol generating assembly.

DETAILED DESCRIPTION

Figure 1:
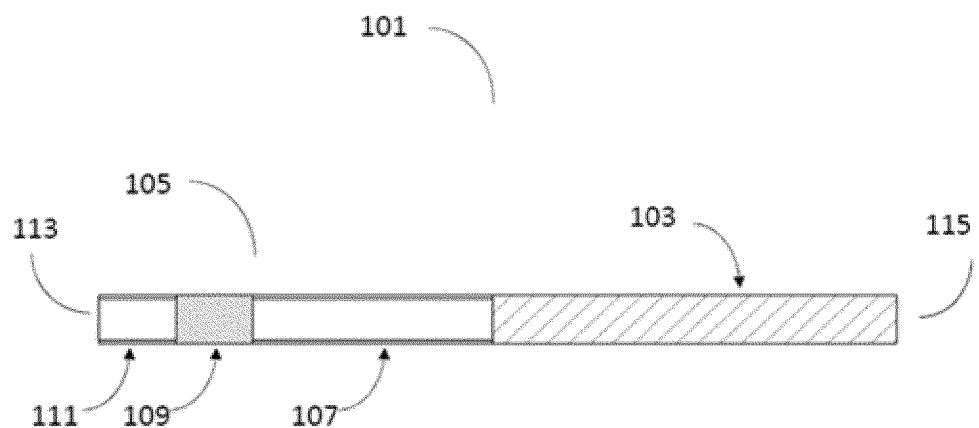
FIG. 1 shows a section view of an example of an aerosol generating article.

The aerosol generating material described herein comprises an "amorphous solid", which may alternatively be referred to as a "monolithic solid" (i.e. non-fibrous), or as a "dried gel". The amorphous solid is a solid material that may retain some fluid, such as liquid, within it. In some cases, the aerosol generating material comprises from about 50 wt %, 60 wt % or 70 wt % of amorphous solid, to about 90 wt %, 95 wt % or 100 wt % of amorphous solid. In some cases, the aerosol generating material consists of amorphous solid.

As described above, the disclosure provides a method of making an aerosol generating material, the aerosol generating material comprising an amorphous solid. The method includes adding a setting agent to a slurry comprising:

1-60 wt % of a gelling agent; and 5-80 wt % of an aerosol generating agent;

and optionally, 0.1-60 wt % of at least one active substance and/or flavorants wherein these weights are calculated on a dry weight basis (DWB).

The setting agent is a calcium source which includes $Ca^{2+}$ cations and one or more counterions. The one or more counterions are anionic.

In one aspect the setting agent has an average molar mass of less than about 400 $gmol^{-1}$. The inventors have identified that using a calcium source which has a lower average molar mass may mean that a smaller mass of setting agent can be used in the manufacturing process while maintaining a relatively high amount of $Ca^{2+}$, thereby reducing manufacturing costs and/or processing issues.

In some embodiments, the setting agent may have an average molar mass of less than about 300 $gmol^{-1}$, or less than about 200 $gmol^{-1}$. In some embodiments, the setting agent may have an average molar mass of greater than about 80 $gmol^{-1}$, or greater than about 100 $gmol^{-1}$, or greater than about 120 $gmol^{-1}$. In some embodiments, the setting agent may have an average molar mass of from about 80 $gmol^{-1}$ to about 400 $gmol^{-1}$, or from about 100 $gmol^{-1}$ to about 300 $gmol^{-1}$, or from about 120 $gmol^{-1}$ to about 200 $gmol^{-1}$.

In some embodiments, each counterion present in the setting agent has a molar mass of less than about 250 $gmol^{-1}$. The inventors have identified that using a calcium source wherein the counterion(s) has a smaller molar mass may allow for a higher effective $Ca^{2+}$ concentration in the setting agent by mass. In some embodiments, each counterion present in the setting agent has a molar mass of less than about 150 $gmol^{-1}$, or less than about 100 $gmol^{-1}$, or less than about 80 $gmol^{-1}$. In some embodiments, each counterion present in the setting agent has a molar mass of greater than about 30 $gmol^{-1}$, or greater than about 40 $gmol^{-1}$. In some embodiments, each counterion present in the setting agent has a molar mass of from about 30 $gmol^{-1}$ to 150 $gmol^{-1}$, or from about 40 $gmol^{-1}$ to 150 $gmol^{-1}$, or from about 40 $gmol^{-1}$ to about 100 $gmol^{-1}$, or from about 40 $gmol^{-1}$ to about 80 $gmol^{-1}$.

As used herein, the molar mass of "each" counterion refers to the molar mass of 1 equivalent anion to $Ca^{2+}$. For example, where the empirical formula of a setting agent includes a plurality of anions, then the mass of "each" counterion refers to the mass of a single anion. For example, the empirical formula of calcium acetate is $Ca(C_2H_3O_2)_2$: the molar mass of each counterion is 59 $gmol^{-1}$, i.e. the molar mass of an acetate anion $[C_2H_3O_2]$.

In some embodiments, $Ca^{2+}$ is present in the setting agent in an amount of at least 15 wt % of the molar mass of $Ca^{2+}$ ions and counterions of the setting agent taken together. The inventors have identified that a higher proportion of $Ca^{2+}$ ions in the setting agent may mean that a smaller amount of setting agent may be used to achieve the same setting effect. In some embodiments, $Ca^{2+}$ is present in the setting agent in an amount of at least about 25 wt %. In some embodiments, $Ca^{2+}$ is present in the setting agent in an amount of less than about 40 wt %, or less than about 30 wt %.

In some embodiments, the one or more counterions of the setting agent comprise acetate, formate, carbonate, hydrogencarbonate (also known as bicarbonate), lactate, chloride, citrate, or a combination thereof.

In some embodiments, the one or more counterions of the setting agent comprise acetate, formate, carbonate, hydrogencarbonate (also known as bicarbonate), lactate, chloride, or a combination thereof.

In some embodiments, the one or more counterions of the setting agent comprise acetate, formate, carbonate, hydrogencarbonate (also known as bicarbonate), lactate, or a combination thereof.

In some embodiments, the one or more counterions of the setting agent comprise acetate, formate, hydrogencarbonate (also known as bicarbonate), lactate, or combinations thereof.

Suitably, the one or more counterions of the setting agent comprise acetate, formate, hydrogencarbonate (also known as bicarbonate), or a combination thereof. In these embodiments the setting agent may comprise calcium acetate, calcium formate, calcium hydrogencarbonate, or a combination thereof.

In some embodiments the one or more counterions are composed of carbon, oxygen and optionally hydrogen. In particular embodiments, the one or more counterions are organic anions. The inventors have identified that using a setting agent which includes carbon-based counterions may provide an amorphous solid which, when heated, provides fewer undesirable components in the inhalable aerosol produced compared with amorphous solids which have been prepared with a setting agent which includes non-carbon-based counterions. In some embodiments, the one or more counterions does not include chloride.

In one embodiment, the setting agent may be provided by combining a calcium source with an acid (suitably a weak acid) to provide the setting agent. In one embodiment, calcium carbonate is treated with a weak acid such as benzoic acid or lactic acid to provide calcium hydrogencarbonate (also known as bicarbonate). This embodiment uses a relatively inexpensive calcium source and converts it to a more soluble setting agent.

In some embodiments, the setting agent is supplied to the slurry in an aqueous vehicle. For example, the setting agent may be provided in an aqueous setting agent suspension, and/or solution. Preferably, the setting agent has a solubility such that at least some of the setting agent is dissolved in an aqueous solvent.

In some embodiments, the setting agent has an aqueous solubility of greater than or equal to about 1 g/100 mL at 20° C. (i.e. 0.1 g/L at 20° C.). In some embodiments, the setting agent has an aqueous solubility of greater than or equal to about 5 g/100 mL at 20° C., or about 10 g/100 mL at 20° C. In some embodiments, the setting agent has an aqueous solubility of less than about 80 g/100 mL at 20° C., or less than about 50 g/100 mL at 20° C. The inventors have identified that using a setting agent having a higher solubility to prepare an amorphous solid may allow for better application of the setting agent to the slurry. On the other hand, using a setting agent with too high a solubility may result in reduced setting activity.

The table below provides physical characteristics of a range of setting agents.

| Setting agent | Formula | Molar mass (gmol$^{-1}$) | Ca$^{2+}$ wt % | Counterion molar mass (gmol$^{-1}$) | Solubility (g/100 mL at 20° C.) |
|---|---|---|---|---|---|
| Calcium acetate | Ca(C$_2$H$_3$O$_2$)$_2$ | 158 | 25% | 59 | 34.7 |
| Calcium formate | Ca(CHO$_2$)$_2$ | 130 | 31% | 45 | 16.6 |
| Calcium carbonate | CaCO$_3$ | 100 | 40% | 60 | 6.17 × 10$^{-4}$ |
| Calcium bicarbonate | Ca(CHO$_3$)$_2$ | 162 | 25% | 61 | 16.6 |
| Calcium lactate | Ca(C$_3$H$_5$O$_3$)$_2$ | 218 | 18% | 89 | ND |
| Calcium chloride | CaCl$_2$ | 111 | 36% | 35.5 | 74.5 |
| Calcium citrate | Ca$_3$(C$_6$H$_5$O$_7$)$_2$ | 498 | 24% | 189 | 0.095 (25° C.) |
| Calcium gluconate* | Ca(C$_6$H$_{11}$O$_7$)$_2$ | 430 | 9% | 195 | ND |
| Calcium gluceptate* | Ca(C$_7$H$_{13}$O$_8$)$_2$ | 490 | 8% | 225 | ND |

ND = no data
* = comparative example

Method of Manufacture

The method comprises (a) forming a slurry comprising components of the amorphous solid or precursors thereof, (b) shaping the slurry, (c) setting the slurry to form a gel, and (d) drying to form an amorphous solid.

The step (b) may comprise forming a layer of slurry. The step (b) of forming a layer of slurry may comprise spraying, casting or extruding the slurry, for example. In some cases, the slurry layer is formed by electrospraying the slurry. In some cases, the slurry layer is formed by casting the slurry.

In some cases, the steps (b) and/or (c) and/or (d) may, at least partially, occur simultaneously (for example, during electrospraying). In some cases, these steps may occur sequentially.

In some cases, the slurry is applied to a carrier. The layer may be formed on a carrier.

The step (c) of setting the gel may comprise the addition of a setting agent to the slurry. Alternatively, setting agent may be added to the slurry in step (b), and step (c) may comprise holding the slurry under predetermined conditions until a gel is formed. The slurry may comprise sodium, potassium or ammonium alginate as a gel-precursor, and the setting agent comprising a calcium source, may be added to the slurry to form a calcium alginate gel.

The total amount of the setting agent may be 0.5-5 wt % (calculated on a dry weight basis). The inventors have found that the addition of too little setting agent may result in an amorphous solid which does not stabilize the amorphous solid components and results in these components dropping out of the amorphous solid. The inventors have found that the addition of too much setting agent results in an amorphous solid that is very tacky and consequently has poor handleability.

Alginate salts are derivatives of alginic acid and are typically high molecular weight polymers (10-600 kDa). Alginic acid is a copolymer of b-D-mannuronic (M) and a-L-guluronic acid (G) units (blocks) linked together with (1,4)-glycosidic bonds to form a polysaccharide. On addition of calcium cations, the alginate crosslinks to form a gel. The inventors have determined that alginate salts with a high G monomer content more readily form a gel on addition of the calcium source. In some cases therefore, the gel-precursor pay comprise an alginate salt in which at least about 40%, 45%, 50%, 55%, 60% or 70% of the monomer units in the alginate copolymer are a-L-guluronic acid (G) units.

The drying step (d) may, in some cases, remove from about 50 wt %, 60 wt %, 70 wt %, 80 wt % or 90 wt % to about 80 wt %, 90 wt % or 95 wt % (WWB) of water in the slurry.

The drying step (d) may, in some cases, may reduce the cast material thickness by at least 80%, suitably 85% or 87%. For instance, the slurry may be cast at a thickness of 2 mm, and the resulting dried amorphous solid material may have a thickness of 0.2 mm.

The slurry itself may also form part of the invention. In some cases, the slurry solvent may consist essentially of or consist of water. In some cases, the slurry may comprise from about 50 wt %, 60 wt %, 70 wt %, 80 wt % or 90 wt % of solvent (WWB).

In some examples, the slurry has a viscosity of from about 10 to about 20 Pa-s at 46.5° C., such as from about 14 to about 16 Pa-s at 46.5° C.

In cases where the solvent consists of water, the dry weight content of the slurry may match the dry weight content of the amorphous solid. Thus, the discussion herein relating to the solid composition is explicitly disclosed in combination with the slurry aspect of the invention, and vice versa.

Aerosol Generating Substrate

As described above, the disclosure provides an aerosol generating substrate comprising an aerosol generating material, the aerosol generating material comprising an amorphous solid, wherein the amorphous solid comprises:

1-60 wt % of a gelling agent; and
5-80 wt % of an aerosol generating agent;
and optionally, 0.1-60 wt % of at least one active substance and/or flavorant; wherein these weights are calculated on a dry weight basis (DWB);

In some embodiments, the amorphous solid comprises:
1-60 wt % of a gelling agent; and
5-80 wt % of an aerosol generating agent;
and optionally, 0.1-60 wt % of at least a tobacco extract and/or nicotine and/or flavorant;
wherein these weights are calculated on a dry weight basis (DWB);

In some embodiments, the amorphous solid comprises from about 1 wt % to about 15 wt % water, or from about 5 wt % to about 15 wt % water, calculated on a wet weight basis (WWB). The inventors have established that if the water content of the amorphous solid is too high, its performance in use is compromised. The high heat capacity of water means that if the water content is too high, more energy is needed to generate an aerosol, reducing operating efficiency. Further, if the water content is too high, the puff profile may be less satisfactory to the consumer due to the generation of hot and humid puffs (a sensation known in the field as "hot puff"). Moreover, if the water content is too high, microbial growth may occur. Conversely, if the water content is too low, the material may be brittle and difficult to handle. The hygroscopic nature of the aerosol generating agent may mean that water is drawn into the material from the atmosphere if the water content is too low, destabilizing the material.

Suitably, the water content of the amorphous solid may be from about 5 wt %, 7 wt % or 9 wt % to about 15 wt %, 13 wt % or 11 wt % (WWB).

In some cases, the amorphous solid may have a thickness of about 0.015 mm to about 1.0 mm. Suitably, the thickness may be in the range of about 0.05 mm, 0.1 mm or 0.15 mm to about 0.5 mm or 0.3 mm. The inventors have found that a material having a thickness of 0.2 mm is particularly suitable. The amorphous solid may comprise more than one layer, and the thickness described herein refers to the aggregate thickness of those layers.

The inventors have established that if the aerosol-forming amorphous solid is too thick, then heating efficiency is compromised. This adversely affects the power consumption in use. Conversely, if the aerosol-forming amorphous solid is too thin, it is difficult to manufacture and handle; a very thin material is harder to cast and may be fragile, compromising aerosol formation in use.

The inventors have established that the amorphous solid thicknesses stipulated herein optimize the material properties in view of these competing considerations.

The thickness stipulated herein is a mean thickness for the material. In some cases, the amorphous solid thickness may vary by no more than 25%, 20%, 15%, 10%, 5% or 1%.

The aerosol generating substrate may comprise a carrier on which the amorphous solid is provided. The carrier functions as a support on which the amorphous solid layer forms, easing manufacture. The carrier may provide rigidity to the amorphous solid layer, easing handling.

The carrier may be any suitable material which can be used to support an amorphous solid. In some cases, the carrier may be formed from materials selected from metal foil, paper, carbon paper, greaseproof paper, ceramic, carbon allotropes such as graphite and graphene, plastic, cardboard, wood or combinations thereof. In some cases, the carrier may comprise or consist of a tobacco material, such as a sheet of reconstituted tobacco. In some cases, the carrier may be formed from materials selected from metal foil, paper, cardboard, wood or combinations thereof. In some cases, the carrier comprises paper. In some cases, the carrier itself be a laminate structure comprising layers of materials selected from the preceding lists. In some cases, the carrier may also function as a flavor carrier. For example, the carrier may be impregnated with a flavorant or with tobacco extract.

Suitably, the thickness of the carrier layer may be in the range of about 10 μm, 15 μm, 15 17 μm, 20 μm, 23 μm, 25 μm, 50 μm, 75 μm or 0.1 mm to about 2.5 mm, 2.0 mm, 1.5 mm, 1.0 mm or 0.5 mm. The carrier may comprise more than one layer, and the thickness described herein refers to the aggregate thickness of those layers.

In some cases, the carrier may be magnetic. This functionality may be used to fasten the carrier to the assembly in use, or may be used to generate particular amorphous solid shapes. In some cases, the aerosol generating substrate may comprise one or more magnets which can be used to fasten the substrate to an induction heater in use.

In some cases, the carrier may be substantially or wholly impermeable to gas and/or aerosol. This prevents aerosol or gas passage through the carrier layer, thereby controlling the flow and ensuring it is delivered to the user. This can also be used to prevent condensation or other deposition of the gas/aerosol in use on, for example, the surface of a heater provided in an aerosol generating assembly. Thus, consumption efficiency and hygiene can be improved in some cases.

In some cases, the surface of the carrier that abuts the amorphous solid may be porous. For example, in one case, the carrier comprises paper. The inventors have found that a porous carrier such as paper is particularly suitable for the present invention; the porous (e.g. paper) layer abuts the amorphous solid layer and forms a strong bond. The amorphous solid is formed by drying a gel and, without being limited by theory, it is thought that the slurry from which the gel is formed partially impregnates the porous carrier (e.g. paper) so that when the gel sets and forms cross-links, the carrier is partially bound into the gel. This provides a strong binding between the gel and the carrier (and between the dried gel and the carrier).

Additionally, surface roughness may contribute to the strength of bond between the amorphous material and the carrier. The inventors have found that the paper roughness (for the surface abutting the carrier) may suitably be in the range of 50-1000 Bekk seconds, suitably 50-150 Bekk seconds, suitably 100 Bekk seconds (measured over an air pressure interval of 50.66-48.00 kPa). (A Bekk smoothness tester is an instrument used to determine the smoothness of a paper surface, in which air at a specified pressure is leaked between a smooth glass surface and a paper sample, and the time (in seconds) for a fixed volume of air to seep between these surfaces is the "Bekk smoothness".)

Conversely, the surface of the carrier facing away from the amorphous solid may be arranged in contact with the heater, and a smoother surface may provide more efficient heat transfer. Thus, in some cases, the carrier is disposed so as to have a rougher side abutting the amorphous material and a smoother side facing away from the amorphous material.

In one particular case, the carrier may be a paper-backed foil; the paper layer abuts the amorphous solid layer and the properties discussed in the previous paragraphs are afforded by this abutment. The foil backing is substantially impermeable, providing control of the aerosol flow path. A metal foil backing may also serve to conduct heat to the amorphous solid.

In another case, the foil layer of the paper-backed foil abuts the amorphous solid. The foil is substantially impermeable, thereby preventing water provided in the amorphous solid to be absorbed into the paper which could weaken its structural integrity.

In some cases, the carrier is formed from or comprises metal foil, such as aluminum foil. A metallic carrier may allow for better conduction of thermal energy to the amorphous solid. Additionally, or alternatively, a metal foil may function as a susceptor in an induction heating system. In particular embodiments, the carrier comprises a metal foil layer and a support layer, such as cardboard. In these embodiments, the metal foil layer may have a thickness of less than 20 µm, such as from about 1 µm to about 10 µm, suitably about 5 µm.

In some cases, the carrier may have a thickness of between about 0.017 mm and about 2.0 mm, suitably from about 0.02 mm, 0.05 mm or 0.1 mm to about 1.5 mm, 1.0 mm, or 0.5 mm.

In some cases, the aerosol generating substrate may comprise embedded heating means, such as resistive or inductive heating elements. For example, the heating means may be embedded in the amorphous solid.

Aerosol-Forming Material Composition

In some cases, the amorphous solid may comprise 1-60 wt % of a gelling agent wherein these weights are calculated on a dry weight basis.

Suitably, the amorphous solid may comprise from about 1 wt %, 5 wt %, 10 wt %, 15 wt %, 20 wt % or 25 wt % to about 50 wt %, 45 wt %, 40 wt %, 35 wt %, 30 wt % or 27 wt % of a gelling agent (all calculated on a dry weight basis). For example, the amorphous solid may comprise 1-50 wt %, 5-40 wt %, 10-30 wt % or 15-27 wt % of a gelling agent.

In some embodiments, the gelling agent comprises a hydrocolloid. In some embodiments, the gelling agent comprises one or more compounds selected from the group comprising alginates, pectins, starches (and derivatives), celluloses (and derivatives), gums, silica or silicones compounds, clays, polyvinyl alcohol and combinations thereof. For example, in some embodiments, the gelling agent comprises one or more of alginates, pectins, hydroxyethyl cellulose, hydroxypropyl cellulose, carboxymethylcellulose, pullulan, xanthan gum guar gum, carrageenan, agarose, acacia gum, fumed silica, PDMS, sodium silicate, kaolin and polyvinyl alcohol. In some cases, the gelling agent comprises alginate and/or pectin, and may be combined with a setting agent (such as a calcium source) during formation of the amorphous solid. In some cases, the amorphous solid may comprise a calcium-crosslinked alginate and/or a calcium-crosslinked pectin.

In some embodiments, the gelling agent comprises alginate, and the alginate is present in the amorphous solid in an amount of from 10-30 wt % of the amorphous solid (calculated on a dry weight basis). In some embodiments, alginate is the only gelling agent present in the amorphous solid. In other embodiments, the gelling agent comprises alginate and at least one further gelling agent, such as pectin.

In some embodiments the amorphous solid may include gelling agent comprising carrageenan.

Suitably, the amorphous solid may comprise from about 5 wt %, 10 wt %, 15 wt %, or 20 wt % to about 80 wt %, 70 wt %, 60 wt %, 55 wt %, 50 wt %, 45 wt % 40 wt %, or 35 wt % of an aerosol generating agent (all calculated on a dry weight basis). The aerosol generating agent may act as a plasticizer. For example, the amorphous solid may comprise 10-60 wt %, 15-50 wt % or 20-40 wt % of an aerosol generating agent. In some cases, the aerosol generating agent comprises one or more compound selected from erythritol, propylene glycol, glycerol, triacetin, sorbitol and xylitol. In some cases, the aerosol generating agent comprises, consists essentially of or consists of glycerol. The inventors have established that if the content of the plasticizer is too high, the amorphous solid may absorb water resulting in a material that does not create an appropriate consumption experience in use. The inventors have established that if the plasticizer content is too low, the amorphous solid may be brittle and easily broken.

The plasticizer content specified herein provides an amorphous solid flexibility which allows the amorphous solid sheet to be wound onto a bobbin, which is useful in manufacture of aerosol generating articles.

In some cases, the amorphous solid may comprise a flavor. Suitably, the amorphous solid may comprise up to about 60 wt %, 50 wt %, 40 wt %, 30 wt %, 20 wt %, 10 wt % or 5 wt % of a flavor. In some cases, the amorphous solid may comprise at least about 0.1 wt %, 0.5 wt %, 1 wt %, 2 wt %, 5 wt % 10 wt %, 20 wt % or 30 wt % of a flavor (all calculated on a dry weight basis). For example, the amorphous solid may comprise 0.1-60 wt %, 1-60 wt %, 5-60 wt %, 10-60 wt %, 20-50 wt % or 30-40 wt % of a flavor. In some cases, the flavor (if present) comprises, consists essentially of or consists of menthol. In some cases, the amorphous solid does not comprise a flavor.

In some cases, the amorphous solid additionally comprises an active substance. For example, in some cases, the amorphous solid additionally comprises a tobacco material and/or nicotine. For example, the amorphous solid may additionally comprise powdered tobacco and/or nicotine and/or a tobacco extract. In some cases, the amorphous solid may comprise from about 1 wt %, 5 wt %, 10 wt %, 15 wt %, 20 wt % or 25 wt % to about 70 wt %, 50 wt %, 45 wt % or 40 wt % (calculated on a dry weight basis) of active substance. In some cases, the amorphous solid may comprise from about 1 wt %, 5 wt %, 10 wt %, 15 wt %, 20 wt % or 25 wt % to about 70 wt %, 60 wt %, 50 wt %, 45 wt % or 40 wt % (calculated on a dry weight basis) of a tobacco material and/or nicotine.

In some cases, the amorphous solid comprises an active substance such as tobacco extract. In some cases, the amorphous solid may comprise 5-60 wt % (calculated on a dry weight basis) of tobacco extract. In some cases, the amorphous solid may comprise from about 5 wt %, 10 wt %, 15 wt %, 20 wt % or 25 wt % to about 55 wt %, 50 wt %, 45 wt % or 40 wt % (calculated on a dry weight basis) tobacco extract. For example, the amorphous solid may comprise 5-60 wt %, 10-55 wt % or 25-55 wt % of tobacco extract. The tobacco extract may contain nicotine at a concentration such that the amorphous solid comprises 1 wt % 1.5 wt %, 2 wt % or 2.5 wt % to about 6 wt %, 5 wt %, 4.5 wt % or 4 wt % (calculated on a dry weight basis) of nicotine. In some cases, there may be no nicotine in the amorphous solid other than that which results from the tobacco extract.

In some embodiments the amorphous solid comprises no tobacco material but does comprise nicotine. In some such cases, the amorphous solid may comprise from about 1 wt %, 2 wt %, 3 wt % or 4 wt % to about 20 wt %, 15 wt %, 10 wt % or 5 wt % (calculated on a dry weight basis) of nicotine. For example, the amorphous solid may comprise 1-20 wt % or 2-5 wt % of nicotine.

In some cases, the total content of active substance and/or flavor may be at least about 0.1 wt %, 1 wt %, 5 wt %, 10 wt %, 20 wt %, 25 wt % or 30 wt %. In some cases, the total content of active substance and/or flavor may be less than about 80 wt %, 70 wt %, 60 wt %/o, 50 wt % or 40 wt % (all calculated on a dry weight basis).

In some cases, the total content of tobacco material, nicotine and flavor may be at least about 0.1 wt %, 1 wt %, 5 wt %, 10 wt %, 20 wt %, 25 wt % or 30 wt %. In some cases, the total content of tobacco material, nicotine and flavor may be less than about 80 wt %, 70 wt %, 60 wt %, 50 wt % or 40 wt % (all calculated on a dry weight basis).

The amorphous solid comprises from about 1 wt % to about 15 wt % water, or 5 wt % to about 15 wt % water, calculated on a wet weight basis. Suitably, the water content of the amorphous solid may be from about 5 wt %, 7 wt % or 9 wt % to about 15 wt %, 13 wt % or 11 wt % (WWB), most suitably about 10 wt %.

In some embodiments, the amorphous solid is a hydrogel and comprises less than about 15 wt % of water calculated on a wet weight basis. In some cases, the hydrogel may comprise less than about 13 wt % or 11 wt % of water calculated on a wet weight basis.

The amorphous solid may be made from a gel, and this gel may additionally comprise a solvent, included at 0.1-50 wt %. However, the inventors have established that the inclusion of a solvent in which the flavor is soluble may reduce the gel stability and the flavor may crystallize out of the gel. As such, in some cases, the gel does not include a solvent in which the flavor is soluble.

In some embodiments, the amorphous solid comprises less than 60 wt % of a filler, such as from 1 wt % to 60 wt %, or 5 wt % to 50 wt %, or 5 wt % to 30 wt %, or 10 wt % to 20 wt %.

In other embodiment, the amorphous solid comprises less than 20 wt %, suitably less than 10 wt % or less than 5 wt % of a filler. In some cases, the amorphous solid comprises less than 1 wt % of a filler, and in some cases, comprises no filler.

The filler, if present, may comprise one or more inorganic filler materials, such as calcium carbonate, perlite, vermiculite, diatomaceous earth, colloidal silica, magnesium oxide, magnesium sulphate, magnesium carbonate, and suitable inorganic sorbents, such as molecular sieves. The filler may comprise one or more organic filler materials such as wood pulp, cellulose and cellulose derivatives.

In particular cases, the amorphous solid comprises less than 5 wt %, 4 wt %, 3 wt %, 2 wt % or 1 wt % particulate calcium carbonate such as chalk, or comprises no particulate calcium carbonate. In some cases, the amorphous solid comprises less than 5 wt %, 4 wt %, 3 wt %, 2 wt % or 1 wt % calcium carbonate, or comprises no calcium carbonate.

In particular embodiments which include filler, the filler is fibrous. For example, the filler may be a fibrous organic filler material such as wood pulp, hemp fiber, cellulose or cellulose derivatives. Without wishing to be bound by theory, it is believed that including fibrous filler in an amorphous solid may increase the tensile strength of the material. This may be particularly advantageous in examples wherein the amorphous solid is provided as a sheet, such as when an amorphous solid sheet circumscribes a rod of aerosolizable material.

In some embodiments, the amorphous solid does not comprise tobacco fibers. In particular embodiments, the amorphous solid does not comprise fibrous material.

In some embodiments, the aerosol generating material does not comprise tobacco fibers. In particular embodiments, the aerosol generating material does not comprise fibrous material.

In some embodiments, the aerosol generating substrate does not comprise tobacco fibers. In particular embodiments, the aerosol generating substrate does not comprise fibrous material.

In some embodiments, the aerosol generating article does not comprise tobacco fibers. In particular embodiments, the aerosol generating article does not comprise fibrous material.

In some examples, the amorphous solid in sheet form may have a tensile strength of from around 200 N/m to around 900 N/m. In some examples, such as where the amorphous solid does not comprise a filler, the amorphous solid may have a tensile strength of from 200 N/m to 400 N/m, or 200 N/m to 300 N/m, or about 250 N/m. Such tensile strengths may be particularly suitable for embodiments wherein the aerosol generating material is formed as a sheet and then shredded and incorporated into an aerosol generating article. In some examples, such as where the amorphous solid comprises a filler, the amorphous solid may have a tensile strength of from 600 N/m to 900 N/m, or from 700 N/m to 900 N/m, or around 800 N/m. Such tensile strengths may be particularly suitable for embodiments wherein the aerosol generating material is included in an aerosol generating article/assembly as a rolled sheet, suitably in the form of a tube.

The aerosol generating material comprising the amorphous solid may have any suitable area density, such as from 30 g/m² to 120 g/m². In some embodiments, aerosol generating material may have an area density of from about 30 to 70 g/m², or about 40 to 60 g/m². In some embodiments, the amorphous solid may have an area density of from about 80 to 120 g/m², or from about 70 to 110 g/m², or particularly from about 90 to 110 g/m². Such area densities may be particularly suitable where the aerosol—
  generating material is included in an aerosol generating article/assembly in sheet form, or as a shredded sheet (described further hereinbelow).

In some cases, the amorphous solid may consist essentially of, or consist of a gelling agent, an aerosol generating agent, an active substance, water, and optionally a flavor.

In some cases, the amorphous solid may consist essentially of, or consist of a gelling agent, an aerosol generating agent, a tobacco material and/or a nicotine source, water, and optionally a flavor.

Aerosol Genera Ting Article and Assembly

A second aspect of the disclosure provides an aerosol generating assembly comprising an aerosol generating substrate according to the first aspect of the disclosure and a heater which is configured to heat not burn the aerosol generating substrate.

In some cases, the heater may heat, without burning, the aerosolizable material to between 120° C. and 350° C. in use. In some cases, the heater may heat, without burning, the aerosolizable material to between 140° C. and 250° C. in use. In some cases in use, substantially all of the amorphous solid is less than about 4 mm, 3 mm, 2 mm or 1 mm from the heater. In some cases, the solid is disposed between about 0.010 mm and 2.0 mm from the heater, suitably between about 0.02 mm and 1.0 mm, suitably 0.1 mm to 0.5 mm. These minimum distances may, in some cases, reflect the thickness of a carrier that supports the amorphous solid. In some cases, a surface of the amorphous solid may directly abut the heater.

The heater is configured to heat not burn the aerosol generating substrate. The heater may be, in some cases, a thin film, electrically resistive heater. In other cases, the heater may comprise an induction heater or the like. The heater may be a combustible heat source or a chemical heat source which undergoes an exothermic reaction to product heat in use. The aerosol generating assembly may comprise a plurality of heaters. The heater(s) may be powered by a battery.

The aerosol generating assembly may additionally comprise a cooling element and/or a filter. The cooling element, if present, may act or function to cool gaseous or aerosol components. In some cases, it may act to cool gaseous components such that they condense to form an aerosol. It may also act to space the very hot parts of the apparatus from the user. The filter, if present, may comprise any suitable filter known in the art such as a cellulose acetate plug.

In some cases, the aerosol generating assembly may be a heat-not-burn device. That is, it may contain a solid tobacco-containing material (and no liquid aerosolizable material). In some cases, the amorphous solid may comprise the tobacco material. A heat-not-burn device is disclosed in WO 2015/062983 A2, which is incorporated by reference in its entirety.

In some cases, the aerosol generating assembly may be an electronic tobacco hybrid device. That is, it may contain a solid aerosolizable material and a liquid aerosolizable material. In some cases, the amorphous solid may comprise nicotine. In some cases, the amorphous solid may comprise a tobacco material. In some cases, the amorphous solid may comprise a tobacco material and a separate nicotine source. The separate aerosolizable materials may be heated by separate heaters, the same heater or, in one case, a downstream aerosolizable material may be heated by a hot aerosol which is generated from the upstream aerosolizable material. An electronic tobacco hybrid device is disclosed in WO 2016/135331 A1, which is incorporated by reference in its entirety.

The disclosure also provides an aerosol generating article for use in an aerosol generating assembly comprising an aerosol generating material according to the first aspect of the disclosure. The article (which may be referred to herein as an aerosol generating article, a cartridge or a consumable) may be adapted for use in a THP, an electronic tobacco hybrid device or another aerosol generating device. In some cases, the article may additionally comprise a filter and/or cooling element (which have been described above). In some cases, the aerosol generating article may be circumscribed by a wrapping material such as paper.

The aerosol generating article may additionally comprise ventilation apertures. These may be provided in the sidewall of the article. In some cases, the ventilation apertures may be provided in the filter and/or cooling element. These apertures may allow cool air to be drawn into the article during use, which can mix with the heated volatilized components thereby cooling the aerosol.

The ventilation enhances the generation of visible heated volatilized components from the article when it is heated in use. The heated volatilized components are made visible by the process of cooling the heated volatilized components such that supersaturation of the heated volatilized components occurs. The heated volatilized components then undergo droplet formation, otherwise known as nucleation, and eventually the size of the aerosol particles of the heated volatilized components increases by further condensation of the heated volatilized components and by coagulation of newly formed droplets from the heated volatilized components.

In some cases, the ratio of the cool air to the sum of the heated volatilized components and the cool air, known as the ventilation ratio, is at least 15%. A ventilation ratio of 15% enables the heated volatilized components to be made visible by the method described above. The visibility of the heated volatilized components enables the user to identify that the volatilized components have been generated and adds to the sensory experience of the smoking experience.

In another example, the ventilation ratio is between 50% and 85% to provide additional cooling to the heated volatilized components. In some cases, the ventilation ratio may be at least 60% or 65%.

In some cases, the aerosol generating material may be included in the article/assembly in sheet form. In some cases, the aerosol generating material may be included as a planar sheet. In some cases, the aerosol generating material may be included as a planar sheet, as a bunched or gathered sheet, as a crimped sheet, or as a rolled sheet (i.e. in the form of a tube). In some such cases, the amorphous solid of these embodiments may be included in an aerosol generating article/assembly as a sheet, such as a sheet circumscribing a rod of aerosolizable material (e.g. tobacco). In some other cases, the aerosol generating material may be formed as a sheet and then shredded and incorporated into the article. In some cases, the shredded sheet may be mixed with cut rag tobacco and incorporated into the article.

The assembly may comprise an integrated aerosol generating article and heater, or may comprise a heater device into which the article is inserted in use.

Figure 2:
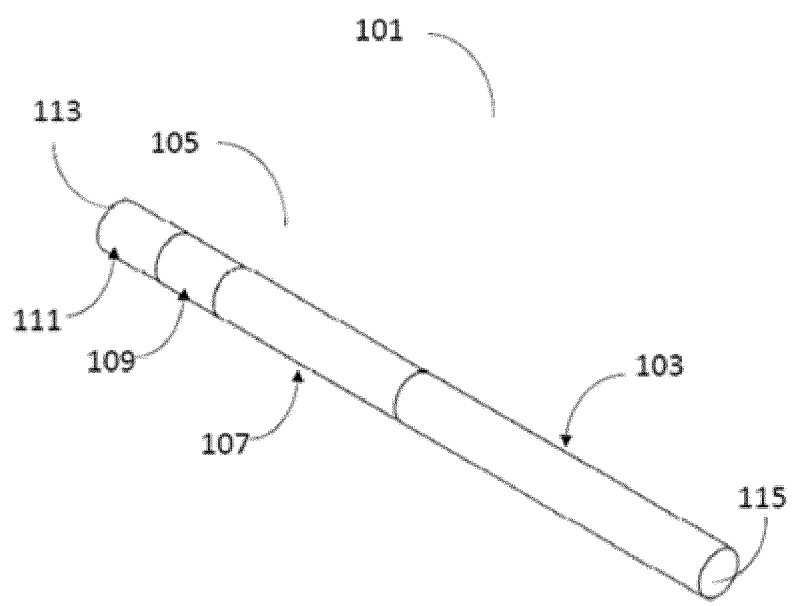
FIG. 2 shows a perspective view of the article of FIG. 1.

Referring to FIGS. 1 and 2, there are shown a partially cut-away section view and a perspective view of an example of an aerosol generating article 101. The article 101 is adapted for use with a device having a power source and a heater. The article 101 of this embodiment is particularly suitable for use with the device 51 shown in FIGS. 5 to 7, described below. In use, the article 101 may be removably inserted into the device shown in FIG. 5 at an insertion point 20 of the device 51.

The article 101 of one example is in the form of a substantially cylindrical rod that includes a body of aerosol generating material 103 and a filter assembly 105 in the form of a rod. The aerosol generating material comprises the amorphous solid material described herein. In some embodiments, it may be included in sheet form. In some embodiments it may be included in the form of a shredded sheet. In some embodiments, the aerosol generating material described herein may be incorporated in sheet form and in shredded form.

The filter assembly 105 includes three segments, a cooling segment 107, a filter segment 109 and a mouth end segment 111. The article 101 has a first end 113, also known as a mouth end or a proximal end and a second end 115, also known as a distal end. The body of aerosol generating material 103 is located towards the distal end 115 of the article 101. In one example, the cooling segment 107 is located adjacent the body of aerosol generating material 103 between the body of aerosol generating material 103 and the filter segment 109, such that the cooling segment 107 is in an abutting relationship with the aerosol generating material 103 and the filter segment 103. In other examples, there may be a separation between the body of aerosol generating material 103 and the cooling segment 107 and between the body of aerosol generating material 103 and the filter segment 109. The filter segment 109 is located in between the cooling segment 107 and the mouth end segment 111. The mouth end segment 111 is located towards the proximal end 113 of the article 101, adjacent the filter segment 109. In one example, the filter segment 109 is in an abutting relationship with the mouth end segment 111. In one embodiment, the total length of the filter assembly 105 is between 37 mm and 45 mm, more preferably, the total length of the filter assembly 105 is 41 mm.

In one example, the rod of aerosol generating material 103 is between 34 mm and 50 mm in length, suitably between 38 mm and 46 mm in length, suitably 42 mm in length.

In one example, the total length of the article 101 is between 71 mm and 95 mm, suitably between 79 mm and 87 mm, suitably 83 mm.

An axial end of the body of aerosol generating material 103 is visible at the distal end 115 of the article 101. However, in other embodiments, the distal end 115 of the article 101 may comprise an end member (not shown) covering the axial end of the body of aerosol generating material 103.

The body of aerosol generating material 103 is joined to the filter assembly 105 by annular tipping paper (not shown), which is located substantially around the circumference of the filter assembly 105 to surround the filter assembly 105 and extends partially along the length of the body of aerosol generating material 103. In one example, the tipping paper is made of 58GSM standard tipping base paper. In one example the tipping paper has a length of between 42 mm and 50 mm, suitably of 46 mm.

In one example, the cooling segment 107 is an annular tube and is located around and defines an air gap within the cooling segment. The air gap provides a chamber for heated volatilized components generated from the body of aerosol generating material 103 to flow. The cooling segment 107 is hollow to provide a chamber for aerosol accumulation yet rigid enough to withstand axial compressive forces and bending moments that might arise during manufacture and whilst the article 101 is in use during insertion into the device 51. In one example, the thickness of the wall of the cooling segment 107 is approximately 0.29 mm.

The cooling segment 107 provides a physical displacement between the aerosol generating material 103 and the filter segment 109. The physical displacement provided by the cooling segment 107 will provide a thermal gradient across the length of the cooling segment 107. In one example the cooling segment 107 is configured to provide a temperature differential of at least 40 degrees Celsius between a heated volatilized component entering a first end of the cooling segment 107 and a heated volatilized component exiting a second end of the cooling segment 107. In one example the cooling segment 107 is configured to provide a temperature differential of at least 60 degrees Celsius between a heated volatilized component entering a first end of the cooling segment 107 and a heated volatilized component exiting a second end of the cooling segment 107. This temperature differential across the length of the cooling element 107 protects the temperature sensitive filter segment 109 from the high temperatures of the aerosol generating material 103 when it is heated by the device 51. If the physical displacement was not provided between the filter segment 109 and the body of aerosol generating material 103 and the heating elements of the device 51, then the temperature sensitive filter segment may 109 become damaged in use, so it would not perform its required functions as effectively.

In one example the length of the cooling segment 107 is at least 15 mm. In one example, the length of the cooling segment 107 is between 20 mm and 30 mm, more particularly 23 mm to 27 mm, more particularly 25 mm to 27 mm, suitably 25 mm.

The cooling segment 107 is made of paper, which means that it is comprised of a material that does not generate compounds of concern, for example, toxic compounds when in use adjacent to the heater of the device 51. In one example, the cooling segment 107 is manufactured from a spirally wound paper tube which provides a hollow internal chamber yet maintains mechanical rigidity. Spirally wound paper tubes are able to meet the tight dimensional accuracy requirements of high-speed manufacturing processes with respect to tube length, outer diameter, roundness and straightness.

In another example, the cooling segment 107 is a recess created from stiff plug wrap or tipping paper. The stiff plug wrap or tipping paper is manufactured to have a rigidity that is sufficient to withstand the axial compressive forces and bending moments that might arise during manufacture and whilst the article 101 is in use during insertion into the device 51.

The filter segment 109 may be formed of any filter material sufficient to remove one or more volatilized compounds from heated volatilized components from the aerosol generating material. In one example the filter segment 109 is made of a mono-acetate material, such as cellulose acetate. The filter segment 109 provides cooling and irritation-reduction from the heated volatilized components without depleting the quantity of the heated volatilized components to an unsatisfactory level for a user.

In some embodiments, a capsule (not illustrated) may be provided in filter segment 109. It may be disposed substantially centrally in the filter segment 109, both across the filter segment 109 diameter and along the filter segment 109 length. In other cases, it may be offset in one or more dimension. The capsule may in some cases, where present, contain a volatile component such as a flavorant or aerosol generating agent.

The density of the cellulose acetate tow material of the filter segment 109 controls the pressure drop across the filter segment 109, which in turn controls the draw resistance of the article 101. Therefore the selection of the material of the filter segment 109 is important in controlling the resistance to draw of the article 101. In addition, the filter segment performs a filtration function in the article 101.

In one example, the filter segment 109 is made of a 8Y15 grade of filter tow material, which provides a filtration effect on the heated volatilized material, whilst also reducing the size of condensed aerosol droplets which result from the heated volatilized material.

The presence of the filter segment 109 provides an insulating effect by providing further cooling to the heated volatilized components that exit the cooling segment 107.

This further cooling effect reduces the contact temperature of the user's lips on the surface of the filter segment 109.

In one example, the filter segment 109 is between 6 mm to 10 mm in length, suitably 8 mm.

The mouth end segment 111 is an annular tube and is located around and defines an air gap within the mouth end segment 111. The air gap provides a chamber for heated volatilized components that flow from the filter segment 109. The mouth end segment 111 is hollow to provide a chamber for aerosol accumulation yet rigid enough to withstand axial compressive forces and bending moments that might arise during manufacture and whilst the article is in use during insertion into the device 51. In one example, the thickness of the wall of the mouth end segment 111 is approximately 0.29 mm. In one example, the length of the mouth end segment 111 is between 6 mm to 10 mm, suitably 8 mm.

The mouth end segment 111 may be manufactured from a spirally wound paper tube which provides a hollow internal chamber yet maintains critical mechanical rigidity. Spirally wound paper tubes are able to meet the tight dimensional accuracy requirements of high-speed manufacturing processes with respect to tube length, outer diameter, roundness and straightness.

The mouth end segment 111 provides the function of preventing any liquid condensate that accumulates at the exit of the filter segment 109 from coming into direct contact with a user.

It should be appreciated that, in one example, the mouth end segment 111 and the cooling segment 107 may be formed of a single tube and the filter segment 109 is located within that tube separating the mouth end segment 111 and the cooling segment 107.

Figure 3:
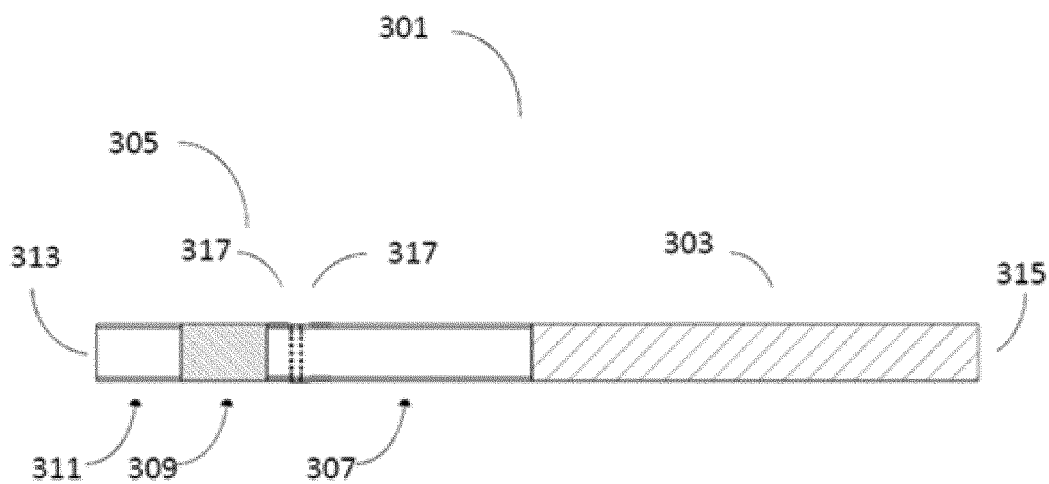
FIG. 3 shows a sectional elevation of an example of an aerosol generating article.
Figure 4:
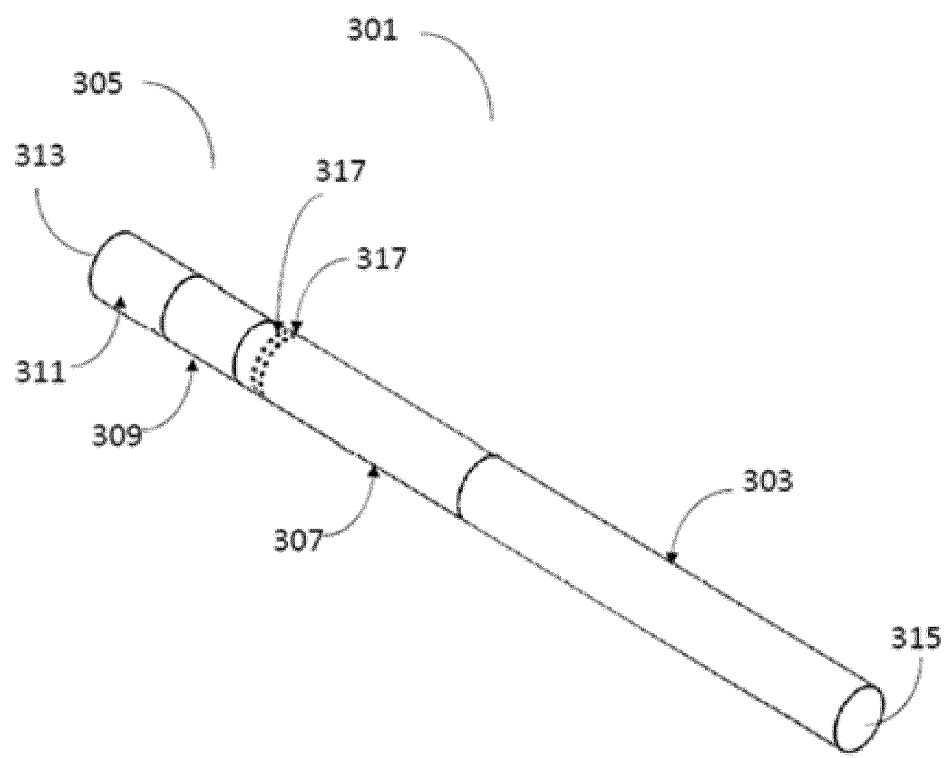
FIG. 4 shows a perspective view of the article of FIG. 3.

Referring to FIGS. 3 and 4, there are shown a partially cut-away section and perspective views of an example of an article 301. The reference signs shown in FIGS. 3 and 4 are equivalent to the reference signs shown in FIGS. 1 and 2, but with an increment of 200.

In the example of the article 301 shown in FIGS. 3 and 4, a ventilation region 317 is provided in the article 301 to enable air to flow into the interior of the article 301 from the exterior of the article 301. In one example the ventilation region 317 takes the form of one or more ventilation holes 317 formed through the outer layer of the article 301. The ventilation holes may be located in the cooling segment 307 to aid with the cooling of the article 301. In one example, the ventilation region 317 comprises one or more rows of holes, and preferably, each row of holes is arranged circumferentially around the article 301 in a cross-section that is substantially perpendicular to a longitudinal axis of the article 301.

In one example, there are between one to four rows of ventilation holes to provide ventilation for the article 301. Each row of ventilation holes may have between 12 to 36 ventilation holes 317. The ventilation holes 317 may, for example, be between 100 to 500 µm in diameter. In one example, an axial separation between rows of ventilation holes 317 is between 0.25 mm and 0.75 mm, suitably 0.5 mm.

In one example, the ventilation holes 317 are of uniform size. In another example, the ventilation holes 317 vary in size. The ventilation holes can be made using any suitable technique, for example, one or more of the following techniques: laser technology, mechanical perforation of the cooling segment 307 or pre-perforation of the cooling segment 307 before it is formed into the article 301. The ventilation holes 317 are positioned so as to provide effective cooling to the article 301.

In one example, the rows of ventilation holes 317 are located at least 11 mm from the proximal end 313 of the article, suitably between 17 mm and 20 mm from the proximal end 313 of the article 301. The location of the ventilation holes 317 is positioned such that user does not block the ventilation holes 317 when the article 301 is in use.

Figure 6:
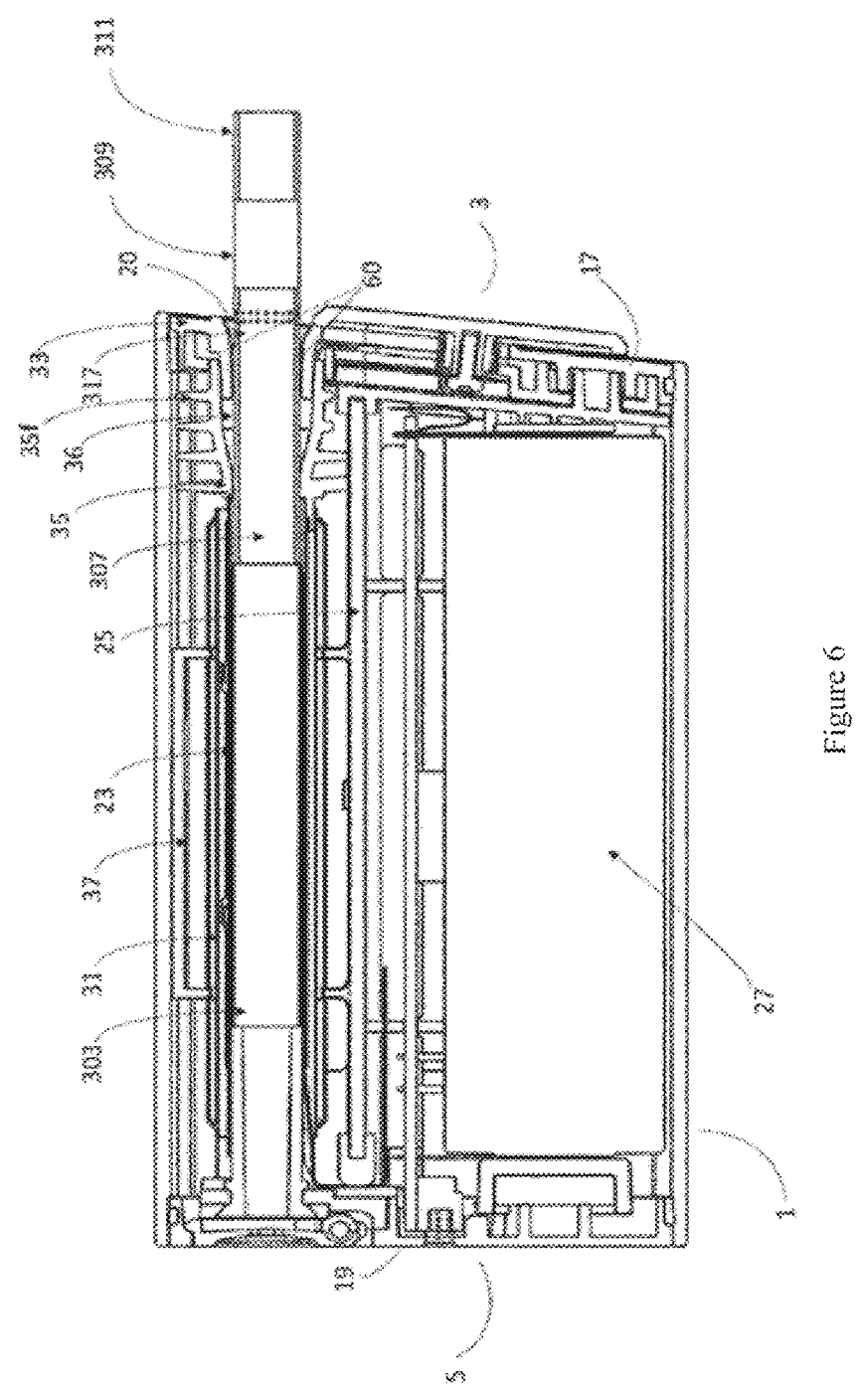
Figure 7:
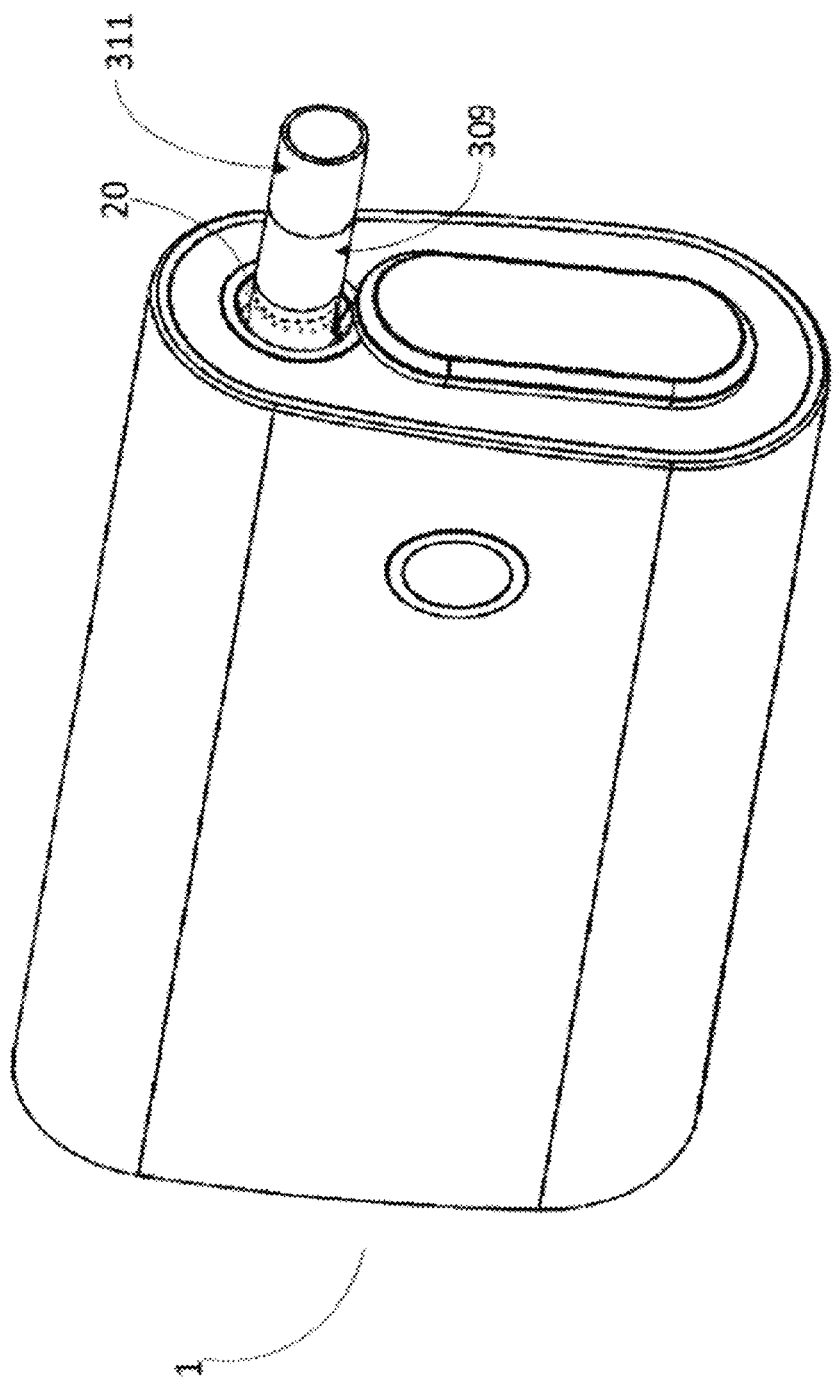
FIG. 7 shows a perspective view of an example of an aerosol generating assembly.

Providing the rows of ventilation holes between 17 mm and 20 mm from the proximal end 313 of the article 301 enables the ventilation holes 317 to be located outside of the device 51, when the article 301 is fully inserted in the device 51, as can be seen in FIGS. 6 and 7. By locating the ventilation holes outside of the device, non-heated air is able to enter the article 301 through the ventilation holes from outside the device 51 to aid with the cooling of the article 301.

The length of the cooling segment 307 is such that the cooling segment 307 will be partially inserted into the device 51, when the article 301 is fully inserted into the device 51. The length of the cooling segment 307 provides a first function of providing a physical gap between the heater arrangement of the device 51 and the heat sensitive filter arrangement 309, and a second function of enabling the ventilation holes 317 to be located in the cooling segment, whilst also being located 5 outside of the device 51, when the article 301 is fully inserted into the device 51. As can be seen from FIGS. 6 and 7, the majority of the cooling element 307 is located within the device 51. However, there is a portion of the cooling element 307 that extends out of the device 51. It is in this portion of the cooling element 307 that extends out of the device 51 in which the ventilation holes 317 are located.

Figure 5:
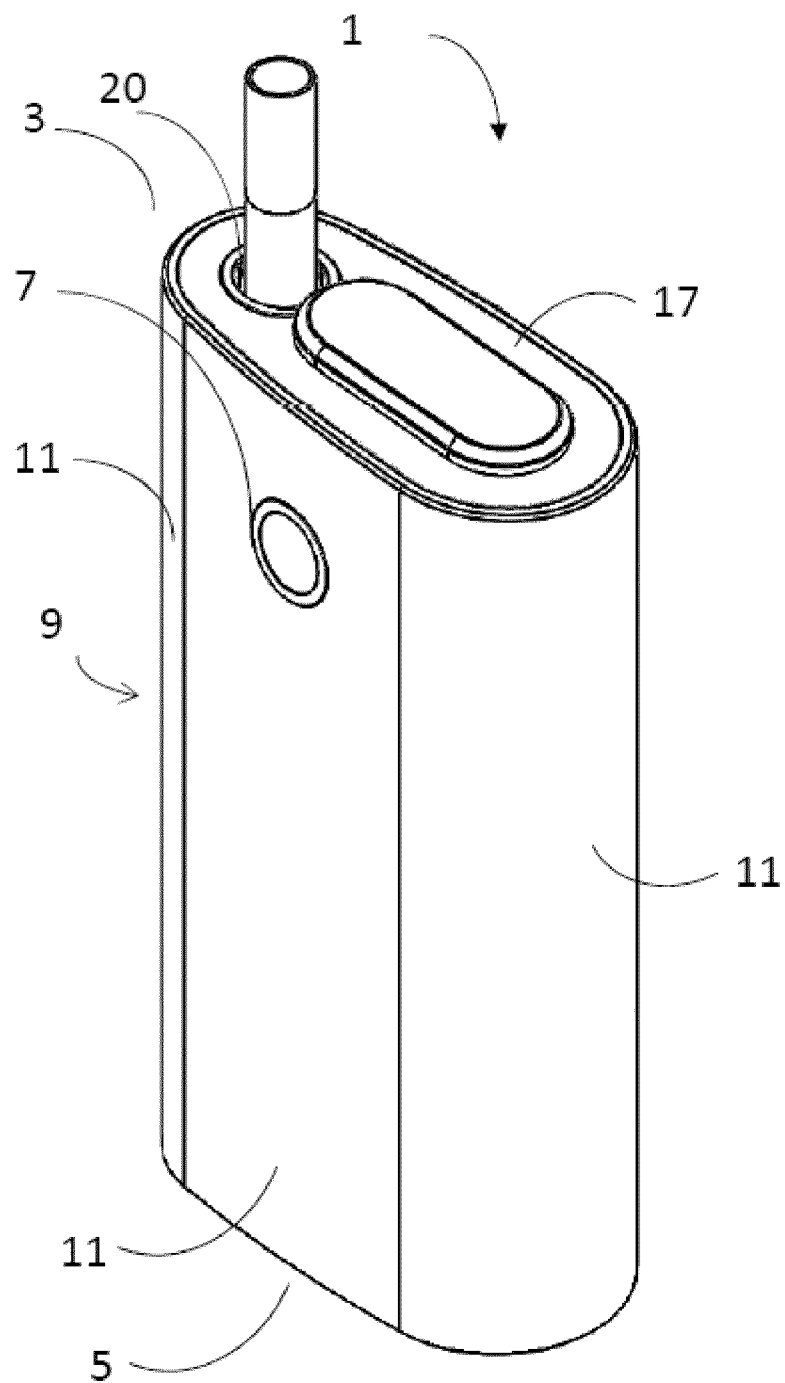
FIG. 5 shows a perspective view of an example of an aerosol generating assembly.

Referring now to FIGS. 5 to 7 in more detail, there is shown an example of a device 51 arranged to heat aerosol generating material to volatilize at least one component of said aerosol generating material, typically to form an aerosol which can be inhaled. The device 51 is a heating device which releases compounds by heating, but not burning, the aerosol generating material.

A first end 53 is sometimes referred to herein as the mouth or proximal end 53 of the device 51 and a second end 55 is sometimes referred to herein as the distal end 55 of the device 51. The device 51 has an on/off button 57 to allow the device 51 as a whole to be switched on and off as desired by a user.

The device 51 comprises a housing 59 for locating and protecting various internal components of the device 51. In the example shown, the housing 59 comprises a uni-body sleeve 11 that encompasses the perimeter of the device 51, capped with a top panel 17 which defines generally the 'top' of the device 51 and a bottom panel 19 which defines generally the 'bottom' of the device 51. In another example the housing comprises a front panel, a rear panel and a pair of opposite side panels in addition to the top panel 17 and the bottom panel 19.

The top panel 17 and/or the bottom panel 19 may be removably fixed to the uni-body sleeve 11, to permit easy access to the interior of the device 51, or may be "permanently" fixed to the uni-body sleeve 11, for example to deter a user from accessing the interior of the device 51. In an example, the panels 17 and 19 are made of a plastics material, including for example glass-filled nylon formed by injection molding, and the uni-body sleeve 11 is made of aluminum, though other materials and other manufacturing processes may be used.

The top panel 17 of the device 51 has an opening 20 at the mouth end 53 of the device 51 through which, in use, the article 101, 301 including the aerosol generating material may be inserted into the device 51 and removed from the device 51 by a user.

The housing 59 has located or fixed therein a heater arrangement 23, control circuitry 25 and a power source 27. In this example, the heater arrangement 23, the control circuitry 25 and the power source 27 are laterally adjacent (that is, adjacent when viewed from an end), with the control circuitry 25 being located generally between the heater arrangement 23 and the power source 27, though other locations are possible.

The control circuitry 25 may include a controller, such as a microprocessor arrangement, configured and arranged to control the heating of the aerosol generating material in the article 101, 301 as discussed further below.

The power source 27 may be for example a battery, which may be a rechargeable battery or a non-rechargeable battery. Examples of suitable batteries include for example a lithium-ion battery, a nickel battery (such as a nickel-cadmium battery), an alkaline battery and/or the like. The battery 27 is electrically coupled to the heater arrangement 23 to supply electrical power when required and under control of the control circuitry 25 to heat the aerosol generating material in the article (as discussed, to volatilize the aerosol generating material without causing the aerosol generating material to burn).

An advantage of locating the power source 27 laterally adjacent to the heater arrangement 23 is that a physically large power source 25 may be used without causing the device 51 as a whole to be unduly lengthy. As will be understood, in general a physically large power source 25 has a higher capacity (that is, the total electrical energy that can be supplied, often measured in Amp-hours or the like) and thus the battery life for the device 51 can be longer.

In one example, the heater arrangement 23 is generally in the form of a hollow cylindrical tube, having a hollow interior heating chamber 29 into which the article 101, 301 comprising the aerosol generating material is inserted for heating in use. Different arrangements for the heater arrangement 23 are possible. For example, the heater arrangement 23 may comprise a single heating element or may be formed of plural heating elements aligned along the longitudinal axis of the heater arrangement 23. The or each heating element may be annular or tubular, or at least part-annular or part-tubular around its circumference. In an example, the or each heating element may be a thin film heater. In another example, the or each heating element may be made of a ceramics material. Examples of suitable ceramics materials include alumina and aluminum nitride and silicon nitride ceramics, which may be laminated and sintered. Other heating arrangements are possible, including for example inductive heating, infrared heater elements, which heat by emitting infrared radiation, or resistive heating elements formed by for example a resistive electrical winding.

In one particular example, the heater arrangement 23 is supported by a stainless steel support tube and comprises a polyimide heating element. The heater arrangement 23 is dimensioned so that substantially the whole of the body of aerosol generating material 103, 303 of the article 101, 301 is inserted into the heater arrangement 23 when the article 101, 301 is inserted into the device 51.

The or each heating element may be arranged so that selected zones of the aerosol generating material can be independently heated, for example in turn (over time, as discussed above) or together (simultaneously) as desired.

The heater arrangement 23 in this example is surrounded along at least part of its length by a thermal insulator 31. The insulator 31 helps to reduce heat passing from the heater arrangement 23 to the exterior of the device 51. This helps to keep down the power requirements for the heater arrangement 23 as it reduces heat losses generally. The insulator 31 also helps to keep the exterior of the device 51 cool during operation of the heater arrangement 23. In one example, the insulator 31 may be a double-walled sleeve which provides a low pressure region between the two walls of the sleeve. That is, the insulator 31 may be for example a "vacuum" tube, i.e. a tube that has been at least partially evacuated so as to minimize heat transfer by conduction and/or convection. Other arrangements for the insulator 31 are possible, including using heat insulating materials, including for example a suitable foam-type material, in addition to or instead of a double-walled sleeve.

The housing 59 may further comprises various internal support structures 37 for supporting all internal components, as well as the heating arrangement 23.

The device 51 further comprises a collar 33 which extends around and projects from the opening 20 into the interior of the housing 59 and a generally tubular chamber 35 which is located between the collar 33 and one end of the vacuum sleeve 31. The chamber 35 further comprises a cooling structure 35f, which in this example, comprises a plurality of cooling fins 35f spaced apart along the outer surface of the chamber 35, and each arranged circumferentially around outer surface of the chamber 35. There is an air gap 36 between the hollow chamber 35 and the article 101, 301 when it is inserted in the device 51 over at least part of the length of the hollow chamber 35. The air gap 36 is around all of the circumference of the article 101, 301 over at least part of the cooling segment 307.

The collar 33 comprises a plurality of ridges 60 arranged circumferentially around the periphery of the opening 20 and which project into the opening 20. The ridges 60 take up space within the opening 20 such that the open span of the opening 20 at the locations of the ridges 60 is less than the open span of the opening 20 at the locations without the ridges 60. The ridges 60 are configured to engage with an article 101, 301 inserted into the device to assist in securing it within the device 51. Open spaces (not shown in the Figures) defined by adjacent pairs of ridges 60 and the article 101, 301 form ventilation paths around the exterior of the article 101, 301. These ventilation paths allow hot vapors that have escaped from the article 101, 301 to exit the device 51 and allow cooling air to flow into the device 51 around the article 101, 301 in the air gap 36.

In operation, the article 101, 301 is removably inserted into an insertion point 20 of the device 51, as shown in FIGS. 5 to 7. Referring particularly to FIG. 6, in one example, the body of aerosol generating material 103, 303, which is located towards the distal end 115, 315 of the article 101, 301, is entirely received within the heater arrangement 23 of the device 51. The proximal end 113, 313 of the article 101, 301 extends from the device 51 and acts as a mouthpiece assembly for a user.

In operation, the heater arrangement 23 will heat the article 101, 301 to volatilize at least one component of the aerosol generating material from the body of aerosol generating material 103, 303.

The primary flow path for the heated volatilized components from the body of aerosol generating material 103, 303 is axially through the article 101, 301, through the chamber inside the cooling segment 107, 307, through the filter segment 109, 309, through the mouth end segment 111, 313 to the user. In one example, the temperature of the heated volatilized components that are generated from the body of aerosol generating material is between 60° C. and 250° C., which may be above the acceptable inhalation temperature for a user. As the heated volatilized component travels through the cooling segment 107, 307, it will cool and some volatilized components will condense on the inner surface of the cooling segment 107, 307.

In the examples of the article 301 shown in FIGS. 3 and 4, cool air will be able to enter the cooling segment 307 via the ventilation holes 317 formed in the cooling segment 307. This cool air will mix with the heated volatilized components to provide additional cooling to the heated volatilized components.

Exemplary Embodiments

In some embodiments, the amorphous solid comprises menthol.

Particular embodiments comprising a menthol-containing amorphous solid may be particularly suitable for including in an aerosol generating article/assembly as a shredded sheet. In these embodiments, the amorphous solid may have the following composition (DWB): gelling agent (preferably comprising alginate, more preferably comprising a combination of alginate and pectin) in an amount of from about 20 wt % to about 40 wt %, or about 25 wt % to 35 wt %; menthol in an amount of from about 35 wt % to about 60 wt %, or from about 40 wt % to 55 wt %; aerosol generating agent (preferably comprising glycerol) in an amount of from about 10 wt % to about 30 wt %, or from about 15 wt % to about 25 wt % (DWB).

In one embodiment, the amorphous solid comprises about 32-33 wt % of an alginate/pectin gelling agent blend; about 47-48 wt % menthol flavorant; and about 19-20 wt % glycerol aerosol generating agent (DWB).

As noted above, the amorphous solid of these embodiments may be included in an aerosol generating article/assembly as a shredded sheet. The shredded sheet may be provided in the article/assembly blended with cut tobacco. Alternatively, the amorphous solid may be provided as a non-shredded sheet. Suitably, the shredded or non-shredded sheet has a thickness of from about 0.015 mm to about 1 mm, preferably from about 0.02 mm to about 0.07 mm.

The amorphous solid of these embodiments may be prepared using any suitable setting agent. In some embodiments, the amorphous solid is prepared by adding a setting agent comprising or consisting of calcium acetate, calcium formate, calcium citrate, calcium hydrogencarbonate, or combinations thereof. When calcium hydrogencarbonate is used, the setting agent may be prepared by combining calcium carbonate and lactic acid and/or benzoic acid. In some embodiments, the amorphous solid is prepared by adding a setting agent comprising or consisting of calcium lactate to the slurry.

Particular embodiments of the menthol-containing amorphous solid may be particularly suitable for including in an aerosol generating article/assembly as a sheet, such as a sheet circumscribing a rod of aerosolizable material (e.g. tobacco). In these embodiments, the amorphous solid may have the following composition (DWB): gelling agent (preferably comprising alginate, more preferably comprising a combination of alginate and pectin) in an amount of from about 5 wt % to about 40 wt %, or about 10 wt % to 30 wt %; menthol in an amount of from about 10 wt % to about 50 wt %, or from about 15 wt % to 40 wt %; aerosol generating agent (preferably comprising glycerol) in an amount of from about 5 wt % to about 40 wt %, or from about 10 wt % to about 35 wt %; and optionally filler in an amount of up to 60 wt %—for example, in an amount of from 5 wt % to 20 wt %, or from about 40 wt % to 60 wt % (DWB).

In one of these embodiments, the amorphous solid comprises about 11 wt % of an alginate/pectin gelling agent blend, about 56 wt % woodpulp filler, about 18% menthol flavorant and about 15 wt % glycerol (DWB).

In another of these embodiments, the amorphous solid comprises about 22 wt % of an alginate/pectin gelling agent blend, about 12 wt % woodpulp filler, about 36% menthol flavorant and about 30 wt % glycerol (DWB).

As noted above, the amorphous solid of these embodiments may be included as a sheet. In one embodiment, the sheet is provided on a carrier comprising paper. In one embodiment, the sheet is provided on a carrier comprising metal foil, suitably aluminum metal foil. In this embodiment, the amorphous solid may abut the metal foil.

In one embodiment, the sheet forms part of a laminate material with a layer (preferably comprising paper) attached to a top and bottom surface of the sheet. Suitably, the sheet of amorphous solid has a thickness of from about 0.015 mm to about 1 mm.

In some embodiments, the amorphous solid comprises a flavorant which does not comprise menthol. In these embodiments, the amorphous solid may have the following composition (DWB): gelling agent (preferably comprising alginate) in an amount of from about 5 to about 40 wt %, or from about 10 wt % to about 35 wt %, or from about 20 wt % to about 35 wt %; flavorant in an amount of from about 0.1 wt % to about 40 wt %, of from about 1 wt % to about 30 wt %, or from about 1 wt % to about 20 wt %, or from about 5 wt % to about 20 wt %; aerosol generating agent (preferably comprising glycerol) in an amount of from 15 wt % to 75 wt %, or from about 30 wt % to about 70 wt %, or from about 50 wt % to about 65 wt %; and optionally filler (suitably woodpulp) in an amount of less than about 60 wt %, or about 20 wt %, or about 10 wt %, or about 5 wt % (preferably the amorphous solid does not comprise filler) (DWB).

In one of these embodiments, the amorphous solid comprises about 27 wt % alginate gelling agent, about 14 wt % flavorant and about 57 wt % glycerol aerosol generating agent (DWB).

In another of these embodiments, the amorphous solid comprises about 29 wt % alginate gelling agent, about 9 wt % flavorant and about 60 wt % glycerol (DWB).

The amorphous solid of these embodiments may be included in an aerosol generating article/assembly as a shredded sheet, optionally blended with cut tobacco. Alternatively, the amorphous solid of these embodiments may be included in an aerosol generating article/assembly as a sheet, such as a sheet circumscribing a rod of aerosolizable material (e.g. tobacco). Alternatively, the amorphous solid of these embodiments may be included in an aerosol generating article/assembly as a layer portion disposed on a carrier.

The amorphous solid of these embodiments may be prepared using any suitable setting agent. In some embodiments, the amorphous solid is prepared by adding a setting agent comprising or consisting of calcium lactate to the slurry.

In some embodiments, the amorphous solid comprises tobacco extract. In these embodiments, the amorphous solid may have the following composition (DWB): gelling agent (preferably comprising alginate) in an amount of from about 5 wt % to about 40 wt %, or about 10 wt % to 30 wt %, or about 15 wt % to about 25 wt %; tobacco extract in an amount of from about 30 wt % to about 60 wt %, or from about 40 wt % to 55 wt %, or from about 45 wt % to about 50 wt %; aerosol generating agent (preferably comprising glycerol) in an amount of from about 10 wt % to about 50 wt %, or from about 20 wt % to about 40 wt %, or from about 25 wt % to about 35 wt % (DWB).

In one embodiment, the amorphous solid comprises about 20 wt % alginate gelling agent, about 48 wt % Virginia tobacco extract and about 32 wt % glycerol (DWB).

The amorphous solid of these embodiments may have any suitable water content. For example, the amorphous solid may have a water content of from about 5 wt % to about 15 wt %, or from about 7 wt % to about 13 wt %, or about 10 wt %.

The amorphous solid of these embodiments may be included in an aerosol generating article/assembly as a shredded sheet, optionally blended with cut tobacco. Alternatively, the amorphous solid of these embodiments may be included in an aerosol generating article/assembly as a sheet, such as a sheet circumscribing a rod of aerosolizable material (e.g. tobacco). Alternatively, the amorphous solid of these embodiments may be included in an aerosol generating article/assembly as a layer portion disposed on a carrier. Suitably, in any of these embodiments, the amorphous solid has a thickness of from about 50 µm to about 200 µm, or about 50 µm to about 100 µm, or about 60 µm to about 90 µm, suitably about 77 µm.

The slurry for forming this amorphous solid may also form part of the invention. In some cases, the slurry may have an elastic modulus of from about 5 to 1200 Pa (also referred to as storage modulus); in some cases, the slurry may have a viscous modulus of about 5 to 600 Pa (also referred to as loss modulus).

The amorphous solid of these embodiments may be prepared using any suitable setting agent. In some embodiments, the amorphous solid is prepared by adding a setting agent comprising or consisting of calcium formate to the slurry.

Definitions

As used herein, the terms "flavor" and "flavorant" refer to materials which, where local regulations permit, may be used to create a desired taste or aroma in a product for adult consumers.

The active substance as used herein may be a physiologically active material, which is a material intended to achieve or enhance a physiological response. The active substance may for example be selected from nutraceuticals, nootropics, psychoactives. The active substance may be naturally occurring or synthetically obtained. The active substance may comprise for example nicotine, caffeine, taurine, theine, vitamins such as B6 or B12 or C, melatonin, cannabinoids, or constituents, derivatives, or combinations thereof. The active substance may comprise one or more constituents, derivatives or extracts of tobacco, cannabis or another botanical.

In some embodiments, the active substance comprises nicotine.

In some embodiments, the active substance comprises caffeine, melatonin or vitamin B12.

As noted herein, the active substance may comprise one or more constituents, derivatives or extracts of cannabis, such as one or more cannabinoids or terpenes.

Cannabinoids are a class of natural or synthetic chemical compounds which act on cannabinoid receptors (i.e., CB1 and CB2) in cells that repress neurotransmitter release in the brain. Cannabinoids may be naturally occurring (phytocannabinoids) from plants such as cannabis, from animals (endocannabinoids), or artificially manufactured (synthetic cannabinoids). Cannabis species express at least 85 different phytocannabinoids, and are divided into subclasses, including cannabigerols, cannabichromenes, cannabidiols, tetrahydrocannabinols, cannabinols and cannabinodiols, and other cannabinoids. Cannabinoids found in cannabis include, without limitation: cannabigerol (CBG), cannabichromene (CBC), cannabidiol (CBD), tetrahydrocannabinol (THC), cannabinol (CBN), cannabinodiol (CBDL), cannabicyclol (CBL), cannabivarin (CBV), tetrahydrocannabivarin (THCV), cannabidivarin (CBDV), cannabichromevarin (CBCV), cannabigerovarin (CBGV), cannabigerol monomethyl ether (CBGM), cannabinerolic acid, cannabidiolic acid (CBDA), Cannabinol propyl variant (CBNV), cannabitriol (CBO), tetrahydrocannabmolic acid (THCA), and tetrahydrocannabivarinic acid (THCV A).

As noted herein, the active substance may comprise or be derived from one or more botanicals or constituents, derivatives or extracts thereof. As used herein, the term "botanical" includes any material derived from plants including, but not limited to, extracts, leaves, bark, fibers, stems, roots, seeds, flowers, fruits, pollen, husk, shells or the like. Alternatively, the material may comprise an active compound naturally existing in a botanical, obtained synthetically. The material may be in the form of liquid, gas, solid, powder, dust, crushed particles, granules, pellets, shreds, strips, sheets, or the like. Example botanicals are tobacco, eucalyptus, star anise, hemp, cocoa, cannabis, fennel, lemongrass, peppermint, spearmint, rooibos, chamomile, flax, ginger, *Ginkgo biloba*, hazel, hibiscus, laurel, licorice (liquorice), matcha, mate, orange skin, papaya, rose, sage, tea such as green tea or black tea, thyme, clove, cinnamon, coffee, aniseed (anise), basil, bay leaves, cardamom, coriander, cumin, nutmeg, oregano, paprika, rosemary, saffron, lavender, lemon peel, mint, juniper, elderflower, vanilla, wintergreen, beefsteak plant, curcuma, turmeric, sandalwood, cilantro, bergamot, orange blossom, myrtle, cassis, valerian, pimento, mace, damien, marjoram, olive, lemon balm, lemon basil, chive, carvi, verbena, tarragon, geranium, mulberry, ginseng, theanine, theacrine, maca, ashwagandha, damiana, guarana, chlorophyll, baobab or any combination thereof. The mint may be chosen from the following mint varieties: *Mentha arvensis, Mentha* c.v., *Mentha niliaca, Mentha piperita, Mentha piperita citrata* c.v., *Mentha piperita* c.v., *Mentha spicata crispa, Mentha cordifolia, Mentha longifolia, Mentha suaveolens variegata, Mentha pulegium, Mentha spicata* c.v. and *Mentha suaveolens*.

In some embodiments, the botanical is selected from eucalyptus, star anise, cocoa and hemp.

In some embodiments, the botanical is selected from rooibos and fennel.

As used herein, the terms "flavor" and "flavorant" refer to materials which, where local regulations permit, may be used to create a desired taste, aroma or other somatosensorial sensation in a product for adult consumers. They may include naturally occurring flavor materials, botanicals, extracts of botanicals, synthetically obtained materials, or combinations thereof (e.g., tobacco, cannabis, licorice (liquorice), hydrangea, eugenol, Japanese white bark magnolia leaf, chamomile, fenugreek, clove, maple, matcha, menthol, Japanese mint, aniseed (anise), cinnamon, turmeric, Indian spices, Asian spices, herb, wintergreen, cherry, berry, red berry, cranberry, peach, apple, orange, mango, clementine, lemon, lime, tropical fruit, papaya, rhubarb, grape, durian, dragon fruit, cucumber, blueberry, mulberry, citrus fruits, Drambuie, bourbon, scotch, whiskey, gin, tequila, rum, spearmint, peppermint, lavender, aloe vera, cardamom, celery, cascarilla, nutmeg, sandalwood, bergamot, geranium, khat, naswar, betel, shisha, pine, honey essence, rose oil, vanilla, lemon oil, orange oil, orange blossom, cherry blossom, cassia, caraway, cognac, jasmine, ylang-ylang, sage, fennel, wasabi, piment, ginger, coriander, coffee, hemp, a mint oil from any species of the genus *Mentha*, eucalyptus, star anise, cocoa, lemongrass, rooibos, flax, *Ginkgo biloba*, hazel, hibiscus, laurel, mate, orange skin, rose, tea such as green tea or black tea, thyme, juniper, elderflower, basil, bay leaves, cumin, oregano, paprika, rosemary, saffron, lemon peel, mint, beefsteak plant, curcuma, cilantro, myrtle, cassis, valerian, pimento, mace, damien, marjoram, olive, lemon balm, lemon basil, chive, carvi, verbena, tarragon, limonene, thymol, camphene), flavor enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. They may be in any suitable form, for example, liquid such as an oil, solid such as a powder, or gas.

The flavor may suitably comprise one or more mint-flavors suitably a mint oil from any species of the genus *Mentha*. The flavor may suitably comprise, consist essentially of or consist of menthol.

In some embodiments, the flavor comprises menthol, spearmint and/or peppermint.

In some embodiments, the flavor comprises flavor components of cucumber, blueberry, citrus fruits and/or redberry.

In some embodiments, the flavor comprises eugenol.

In some embodiments, the flavor comprises flavor components extracted from tobacco.

In some embodiments, the flavor comprises flavor components extracted from cannabis.

In some embodiments, the flavor may comprise a sensate, which is intended to achieve a somatosensorial sensation which are usually chemically induced and perceived by the stimulation of the fifth cranial nerve (trigeminal nerve), in addition to or in place of aroma or taste nerves, and these may include agents providing heating, cooling, tingling, numbing effect. A suitable heat effect agent may be, but is not limited to, vanillyl ethyl ether and a suitable cooling agent may be, but not limited to eucalyptol, WS-3.

As used herein, the term "aerosol generating agent" refers to an agent that promotes the generation of an aerosol. An aerosol generating agent may promote the generation of an aerosol by promoting an initial vaporization and/or the condensation of a gas to an inhalable solid and/or liquid aerosol.

Suitable aerosol generating agents include, but are not limited to: a polyol such as erythritol, sorbitol, glycerol, and glycols like propylene glycol or triethylene glycol; a non-polyol such as monohydric alcohols, high boiling point hydrocarbons, acids such as lactic acid, glycerol derivatives, esters such as diacetin, triacetin, triethylene glycol diacetate, triethyl citrate or myristates including ethyl myristate and isopropyl myristate and aliphatic carboxylic acid esters such as methyl stearate, dimethyl dodecanedioate and dimethyl tetradecanedioate. The aerosol generating agent may suitably have a composition that does not dissolve menthol. The aerosol generating agent may suitably comprise, consist essentially of or consist of glycerol.

As used herein, the term "tobacco material" refers to any material comprising tobacco or derivatives therefore. The term "tobacco material" may include one or more of tobacco, tobacco derivatives, expanded tobacco, reconstituted tobacco or tobacco substitutes. The tobacco material may comprise one or more of ground tobacco, tobacco fiber, cut tobacco, extruded tobacco, tobacco stem, reconstituted tobacco and/or tobacco extract.

The tobacco used to produce tobacco material may be any suitable tobacco, such as single grades or blends, cut rag or whole leaf, including Virginia and/or Burley and/or Oriental. It may also be tobacco particle 'fines' or dust, expanded tobacco, stems, expanded stems, and other processed stem materials, such as cut rolled stems. The tobacco material may be a ground tobacco or a reconstituted tobacco material. The reconstituted tobacco material may comprise tobacco fibers, and may be formed by casting, a Fourdrinier-based paper making-type approach with back addition of tobacco extract, or by extrusion.

All percentages by weight described herein (denoted wt %) are calculated on a dry weight basis, unless explicitly stated otherwise. All weight ratios are also calculated on a dry weight basis. A weight quoted on a dry weight basis refers to the whole of the extract or slurry or material, other than the water, and may include components which by themselves are liquid at room temperature and pressure, such as glycerol. Conversely, a weight percentage quoted on a wet weight basis refers to all components, including water.

For the avoidance of doubt, where in this specification the term "comprises" is used in defining the invention or features of the invention, embodiments are also disclosed in which the invention or feature can be defined using the terms "consists essentially of" or "consists of" in place of "comprises". Reference to a material "comprising" certain features means that those features are included in, contained in, or held within the material.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of making an aerosol generating material comprising an amorphous solid, the method comprising:
    (a) providing a slurry comprising:
        1-60 wt % of a gelling agent, calculated on a dry weight basis; and
        5-80 wt % of an aerosol generating agent, calculated on a dry weight basis; and optionally, 0.1-60 wt % of at least one active substance, flavorant, or combination thereof, calculated on a dry weight basis;

(b) shaping the slurry;

(c) setting the slurry to form a gel; and (d) drying the gel to form an amorphous solid;

wherein 0.5-5 wt % of a setting agent comprising $Ca^{2+}$ ions and one or more counterions is added to the slurry after step (a) and before and/or during the shaping step (b) or the setting step (c), or during both the shaping step (b) and the setting step (c), the setting agent having an average molar mass of less than about 400 gmol$^{-1}$ and an aqueous solubility of greater than or equal to 1 g/100 mL at 20° C.; and wherein the one or more counterions does not include chloride.

2. A method according to claim 1, wherein the Ca$^{2+}$ ions are present in the setting agent in an amount of at least 15% of the molar mass of Ca$^{2+}$ ions and counterions of the setting agent taken together.

3. A method according to claim 1, wherein each counterion present in the setting agent has a molar mass of less than about 250 gmol$^{-1}$.

4. A method according to claim 3, wherein the molar mass of each counterion present in the setting agent is from about 40 to about 150 gmol$^{-1}$.

5. A method according to claim 1, wherein the setting agent is added to the slurry with an aqueous solvent.

6. A method according to claim 5, wherein the setting agent is added to the slurry as an aqueous setting agent solution.

7. A method according to claim 1, wherein the setting agent is sprayed onto the slurry.

8. A method according to claim 1, wherein the one or more counterions comprise acetate, formate, hydrogencarbonate, lactate, or a combination thereof.

9. A method according to claim 1, wherein the gelling agent comprises alginate, and the alginate is present in the slurry in an amount of about 10 to about 30 wt %, on a dry weight basis.

10. A method according to claim 1, wherein the shaping the slurry step (b) comprises forming the slurry as a sheet.

11. A method according to claim 1, wherein the one or more counterions is a carbon-containing anion.

12. A method of making an aerosol generating material comprising an amorphous solid, the method comprising:
  (a) providing a slurry comprising:
    1-60 wt % of a gelling agent, calculated on a dry weight basis; and
    5-80 wt % of an aerosol generating agent, calculated on a dry weight basis; and
    optionally, 0.1-60 wt % of at least one active substance, flavorant, or combination thereof, calculated on a dry weight basis;
  (b) shaping the slurry;
  (c) setting the slurry to form a gel, and
  (d) drying the gel to form an amorphous solid;
  wherein 0.5-5 wt % of a setting agent comprising Ca$^{2+}$ ions and one or more counterions is added to the slurry after step (a) and before and/or during the shaping step (b) or the setting step (c), or during both the shaping step (b) and the setting step (c); and
  wherein the Ca$^{2+}$ ions are present in the setting agent in an amount of at least 15% of the molar mass of Ca$^{2+}$ ions and counterions taken together; and
  wherein the setting agent has an aqueous solubility of greater than or equal to 1 g/100 mL at 20° C.; and
  wherein the one or more counterions does not include chloride.

13. A method of making an aerosol generating material comprising an amorphous solid, the method comprising:
  (a) providing a slurry comprising:
    1-60 wt % of a gelling agent, calculated on a dry weight basis; and
    5-80 wt % of an aerosol generating agent, calculated on a dry weight basis; and
    optionally, 0.1-60 wt % of at least one active substance, flavorant, or combination thereof, calculated on a dry weight basis,
  (b) shaping the slurry;
  (c) setting the slurry to form a gel; and
  (d) drying the gel to form an amorphous solid;
  wherein 0.5-5 wt % of a setting agent comprising Ca$^{2+}$ ions and one or more counterions is added to the slurry after step (a) and before and/or during the shaping step (b) or the setting step (c), or during both the shaping step (b) and the setting step (c); and
  wherein each counterion present in the setting agent has a molar mass of less than about 250 gmol$^{-1}$; and
  wherein the setting agent has an aqueous solubility of greater than or equal to 1 g/100 mL at 20° C.; and
  wherein the one or more counterions does not include chloride.

* * * * *